US008967943B2

(12) United States Patent
Drott et al.

(10) Patent No.: US 8,967,943 B2
(45) Date of Patent: Mar. 3, 2015

(54) LOAD CARRIER FOR TRANSPORT OF WOOD

(75) Inventors: Maria Drott, Göteborg (SE); Torbjörn Eriksson, Fengersfors (SE); Lennart Olving, Hålta (SE)

(73) Assignee: Green Wood Logistics AB, Göteborg (SE)

( * ) Notice: Subject to any disclaimer, the term of this patent is extended or adjusted under 35 U.S.C. 154(b) by 326 days.

(21) Appl. No.: 13/522,740

(22) PCT Filed: Jan. 17, 2011
(Under 37 CFR 1.47)

(86) PCT No.: PCT/SE2011/000003
§ 371 (c)(1),
(2), (4) Date: Jul. 18, 2012

(87) PCT Pub. No.: WO2011/090415
PCT Pub. Date: Jul. 28, 2011

(65) Prior Publication Data
US 2013/0170941 A1 Jul. 4, 2013

(30) Foreign Application Priority Data
Jan. 19, 2010 (SE) ...................... 1050061

(51) Int. Cl.
*B66C 17/08* (2006.01)
*B60P 3/41* (2006.01)
*B65D 88/12* (2006.01)
*B65D 88/52* (2006.01)
(Continued)

(52) U.S. Cl.
CPC ................. *B60P 3/41* (2013.01); *B65D 88/129* (2013.01); *B65D 88/522* (2013.01); *B65D 90/0033* (2013.01); *B65D 90/18* (2013.01)
USPC ............ 414/809; 410/37; 410/46; 211/41.14; 211/41.16

(58) Field of Classification Search
USPC .............. 414/809, 498; 211/70, 120.7, 41.14, 211/41.15, 41.16; 410/37, 120, 46
See application file for complete search history.

(56) References Cited

U.S. PATENT DOCUMENTS

2002/0139878 A1 10/2002 Johnson et al.

FOREIGN PATENT DOCUMENTS

| EP | 0 890 530 | 1/1999 |
| EP | 1 775 237 | 4/2007 |
| GB | 2 330 820 | 5/1999 |

(Continued)

*Primary Examiner* — Saul Rodriguez
*Assistant Examiner* — Emery Hassan
(74) *Attorney, Agent, or Firm* — Nixon & Vanderhye P.C.

(57) ABSTRACT

A load carrier includes a load changing frame that has first and second end portions. The load changing frame has two longitudinal frame beams, two transverse frame beams arranged at the end portions of the load changing frame, and a first, upwardly tapering lifting stand. The second end portion of the load changing frame includes a second lifting stand, which is shaped and arranged in accordance with the first lifting stand. The transverse frame beams are elongated to extend outward from the longitudinal frame beams for mounting of supports facing the support surface. A plurality of such load carriers are adapted to be stacked on top of each other, wherein each overlying load carrier with its lifting stands is adapted to straddle the lifting stands of the underlying load carrier vertically from above, wherein the length of the stack corresponds to the length of the load carrier.

33 Claims, 19 Drawing Sheets

(51) Int. Cl.
    *B65D 90/00*    (2006.01)
    *B65D 90/18*    (2006.01)

(56) References Cited

FOREIGN PATENT DOCUMENTS

| | | |
|---|---|---|
| GB | 2 415 957 | 1/2006 |
| JP | 57-140243 | 8/1982 |
| WO | WO 01/68506 | 9/2001 |
| WO | WO 01/70599 | 9/2001 |
| WO | WO 2004/013006 | 2/2004 |

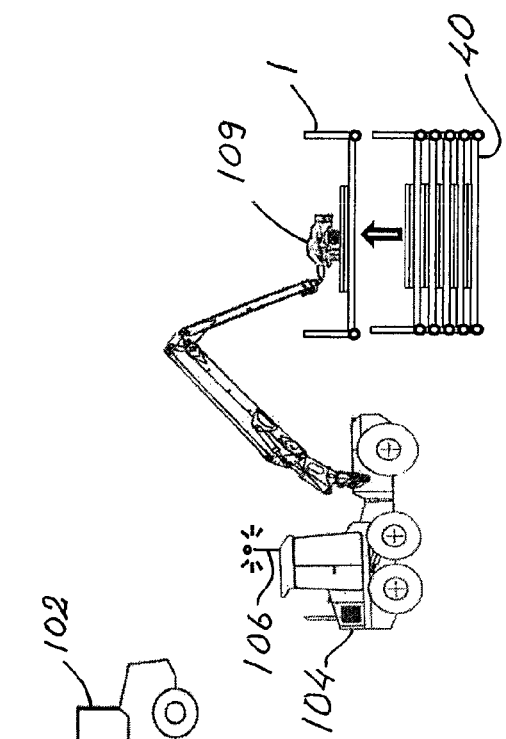
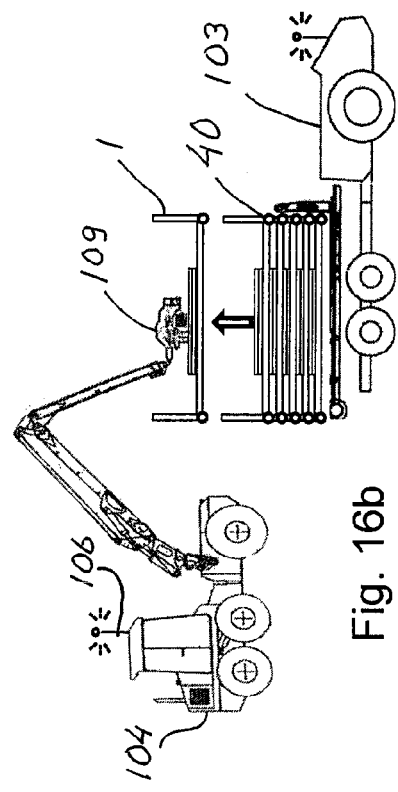
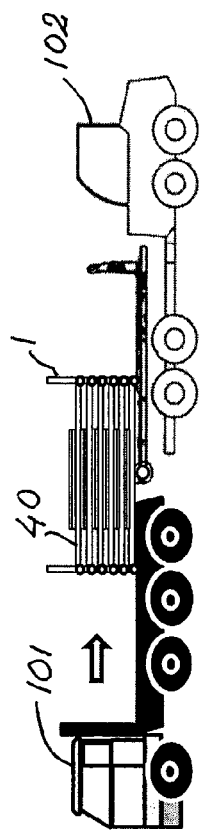
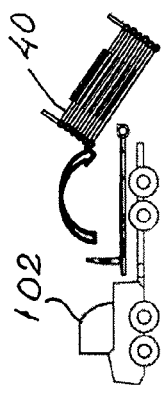
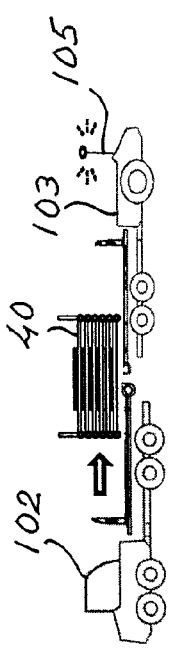
Fig. 15a
Fig. 15b
Fig. 15c
Fig. 16a
Fig. 16b

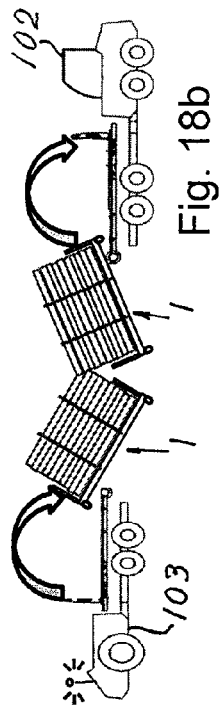
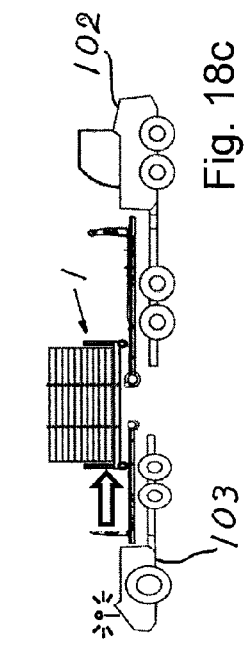
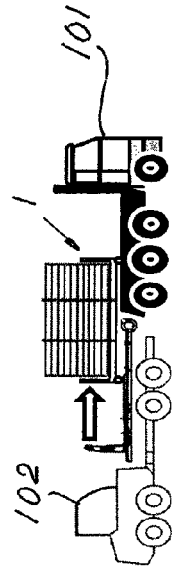
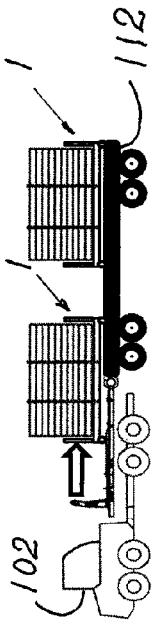
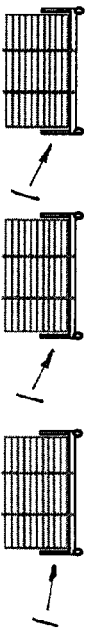
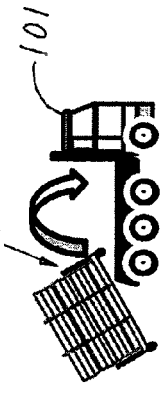
Fig. 19a
Fig. 19b
Fig. 19c
Fig. 19d
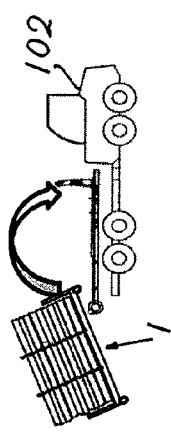
Fig. 18a
Fig. 18b
Fig. 18c

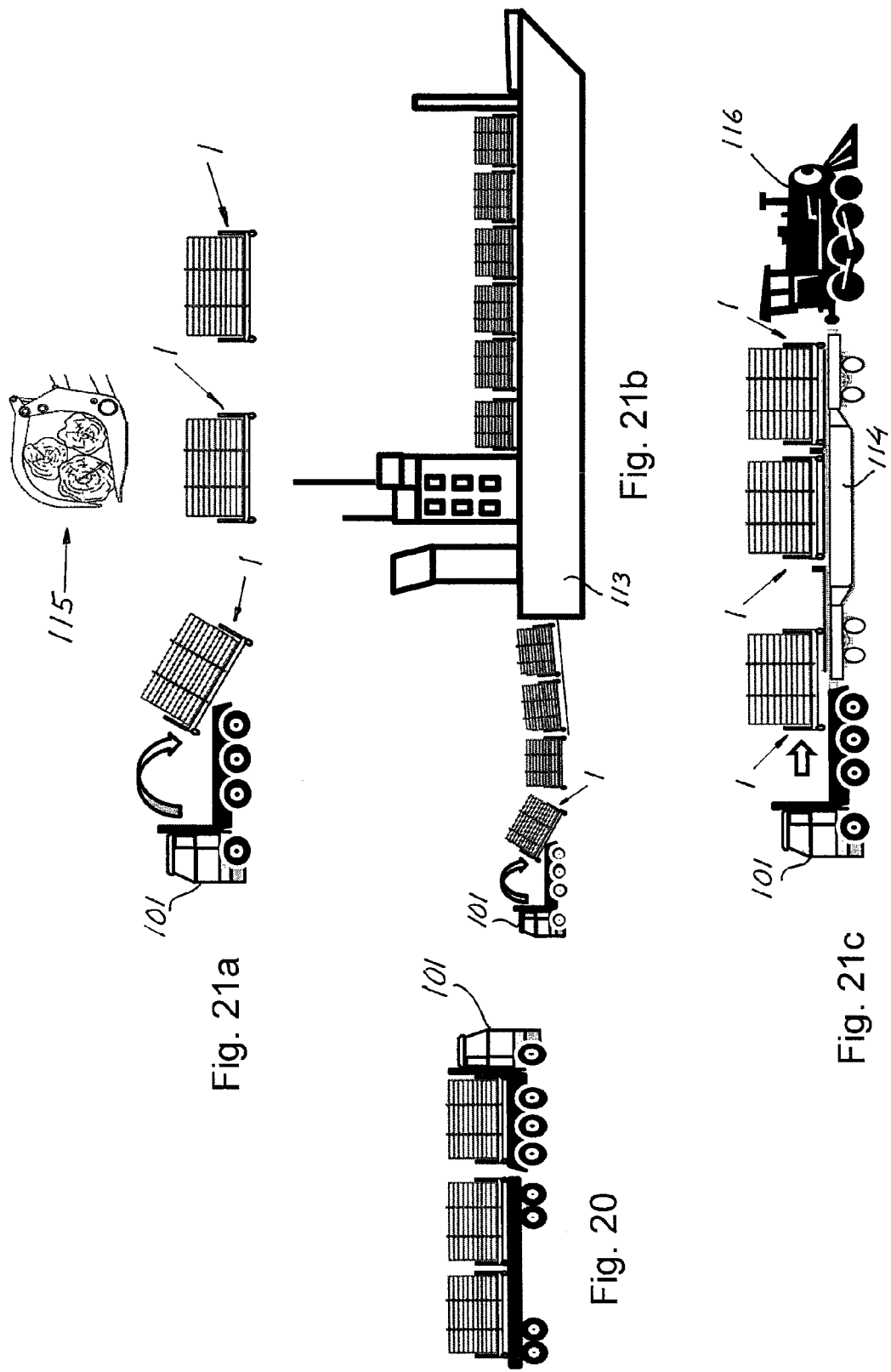

LOAD CARRIER FOR TRANSPORT OF WOOD

This application is the U.S. national phase of International Application No. PCT/SE2011/000003 filed 17 Jan. 2011 which designated the U.S. and claims priority to Swedish Patent Application No. 1050061-9 filed 19 Jan. 2010, the entire contents of each of which are hereby incorporated by reference.

The present invention relates to a load carrier for transport of wood in the form of logs, said load carrier defining a longitudinal centre plane and comprising a load changing frame, which has a first end portion and a second end portion, said load changing frame comprising two longitudinal frame beams, two transverse frame beams arranged at the end portions of the load changing frame, and a first lifting stand that is arranged at the first end portion of the load changing frame and that has two legs, which have a lower end portion and an associated lower end, said lifting stand legs being rigidly connected by their ends or end portions to the end portions or ends of the longitudinal frame beams adjacent to the transverse frame beam and extending upward from the longitudinal frame beams, wherein the lifting stand exhibits a web portion and a top portion, said top portion forming a cross connection for anchoring the lifting stand legs to each other, said cross connection comprising a loop-forming lifting loop, with which a gripper of a lifting beam of a load changer is intended to be brought into engagement, and wherein the lifting stand tapers in an upward direction toward said centre plane and is open in a vertical direction downward.

The invention also relates to a method of handling wood in the form of logs from harvesting site to final destination while using said load carrier.

The expressions "load changer" and "load changing vehicle", which are used synonymously in the present patent application, primarily refer to a vehicle with equipment for handling of detached load carriers with or without load, so-called transfer of loads. The expressions "load changing frame" and "frame for load changing", which are used synonymously in the present patent application, refer to a runner-forming chassis or undercarriage of said load carrier, which is adapted to be handled by said vehicle. In the present patent application, the expression "load transfer system" refers to a system that primarily comprises said vehicle and said load carrier, which are fully compatible with each other to enable transfer of load carriers between two support surfaces which are located at different levels, e.g. firm ground and vehicle chassis, or on the same or substantially the same levels, e.g. two vehicle chassises. The load transfer system also comprises trailers for said load changing vehicles and railway cargo cars, wherein the railway cars have superstructures for transfer of loads which are pivotable in the horizontal plane, enabling a load changing vehicle and such a pivotable superstructure for transfer of loads to be aligned with each other for linear transfer of a load carrier between the load changing vehicle and the railway car. The load transfer system also comprises different types of means of transport for sea transport with equipment for handling the load carriers.

Wood primarily refers to all kinds of forest raw material in unprocessed form, such as logs cut into lengths, and in processed form, such as timber cut into lengths.

The forest industry struggles with an increased international competition, poor profitability for some operators in the field, too large capital tie-up, sometimes difficult working conditions, and an unacceptable environmental destruction with a negative impact on the climate. There is therefore a large need for a radical industrial change, which redefines the business logics of all work operations from the harvesting site to the processing plant. The raw material supply must become more flexible and more cost-efficient. To be able to bring about long-term productivity improvements in the entire logistics chain, all work operations must be seen as part of a coherent, unitary harvesting and handling process from harvesting all the way to processing. Only in this way prerequisites for a good economy of operation and a greatly reduced environmental load can be created. Prerequisites for cutting production costs, reducing capital tie-up, and simultaneously minimizing expensive environmental losses must be created.

FIG. 1 illustrates the way in which the traditional harvesting and handling process is carried out in ten successive steps.

Step 1. Selling of Forest Raw Material

The forest owner primarily sells either standing trees, or free at roadside or free at mill, to sawmill and pulp mill customers, directly or via their own procurement companies, alternatively independent purchasers. At present, a small share of the sales is from standing wood lots and a larger share from delivery at road or plant. A number of factors, such as a fluctuating demand for special transports, shortcomings of the road network, etc., make it difficult to create a raw material flow that is adapted to the needs of the industry. The economic compensation to the purchaser is commission-based and is paid by the customer. When selling direct to customer, the customer gets the corresponding commission. The forest owner does not receive full payment until the wood has been measured by Virkesmätarföreningen (VMF) at customer location. Full payment may be delayed up to 12 months. When selling standing wood lots, the payment takes place in connection with the sale.

Step 2. Harvesting

The forest owner or the wood purchaser places a harvesting order. The harvester fells and registers measurement data for harvested wood. At the same moment as the harvester drops the log to the ground, the link between registered, valuable measurement data and the individual piece of wood disappears and is thereby lost for the further process. The harvester contractor is paid by quantity of wood delivered and does not receive full payment for his/her work until the wood has been measured by VMF at customer location. Full payment may be delayed up to 12 months. The price is mainly decided by mean stem.

Steps 3, 5, 7, 10. Storage of Wood in Storage Site

During the winter half-year the wood may be hidden under snow and be left lying until once again there is no snow on the ground. When the snow melts, parts of the road network cannot support the trucks due to thawing of frozen ground. The risk of quality degradation increases depending on how long the wood is left lying in this way. Furthermore, if it is not fresh, the mill's processing of the wood is made more difficult. The wood may be left lying at the roadside for several months and tie up capital. If the "marking label" assigned to the wood pile disappears at this stage, the wood becomes ownerless, and can, in principle, be delivered to any customer. This implies that the forest owner risks not being paid, and that the right customer does not receive the quantity of wood that has been demanded. If the receiver has no time to measure the wood at delivery, the wood may be left unregistered. Furthermore, the plant places the raw material in storage to ensure the availability of raw material during the periods when raw material deliveries are short. Such storages create various different costs. For each day that the wood is left lying, capital to a corresponding value is tied up for forest owners and forest machine contractors.

Step 4. Forwarding

The forwarder usually loads the harvested wood by assortment and transports it to a roadside landing, where the wood may undergo certain additional sorting. The sorting during the forwarding step is done by visual inspection. The log landing area should be designed in accordance with the regulations of the road administration with regard to traffic safety, and be cleaned after pick-up. Since the timber is scattered across a large harvesting area, the forwarder has to drive around the whole area to pick up and load harvested wood lying on the ground. This driving is jerky and results in high carbon dioxide emissions. According to performed investigations, out of the total time of use of the forwarder, the time for driving while loading amounts to 11 percent and the time for loading to 41 percent. The high weight of the forwarders causes large environmental loads. The machines require qualified drivers with training for crane operation. At the same time, a poor working environment with a risk of injuries, noise, strong vibrations and stressful maintenance work is offered. To keep up with the pace of the harvester usually two forwarders, or twice as long working hours, are needed to load and take harvested wood away from the harvesting site. The forwarder contractor is paid by quantity of wood delivered, and does not receive full payment for his/her work first until the wood has been measured by VMF at customer location. Full payment can be delayed up to 12 months. The price is mainly decided by the average distance to the harvesting area and the number of assortments. In spite of the approx. 50 percent lower capacity, the compensation to the forwarder per m3f ub is approximately equal to the one of the harvester.

Step 6. Loading with Crane for Further Transport on Truck

Specially built, crane-equipped timber trucks load the sorted timber from said roadside landing. Only a small number of logs are marked, for which reason the sorting cannot be fully maintained. The fluctuating transport demand creates difficulties in maintaining the capacity during harvesting peaks, both with regard to timber trucks and drivers with training for crane operation. The crane operation may cause both working injuries and accidents. Timber trucks often have to wait for unloading at customer location and usually drive back with no return load to the next landing. The timber trucks may weigh up to 60 tons, but overloading occurs with both traffic safety problems and road wear as a consequence. To get a full load, wood from different owners is sometimes loaded on the same transport, for which reason there is a risk of mixing up the different wood lots. The haulage contractors are paid per ton, kilometre or m3f ub, with an adjustment for changes in diesel price. The haulage contractors association pays the haulage contractor within thirty days, but may itself have to wait for payment from the haulage contractor's customer.

Steps 8, 9. Measurement and Payment

After delivery to customer, the wood is measured by an independent representative from VMF. This delivery report is then the basis for how much the forest owner and the forest contractors are to be paid. During the actual harvesting event, the information about the harvested wood is stored in the computers of the harvester and is thus already available, but, due to the shortcomings of the current logistics chain, as much as 20 percent of the wood can be lost in the handling process. This is primarily due to imperfections in the sorting in the current delivery system, and in that the customer thus does not get the right grade for the right purpose, but also in that wood is registered to the wrong owner. The forest owner is paid for wood delivered according to the quality grades and quantities which VMF has determined during the measurements. Payment for harvesting and transportation up to delivery point is handled by the forest owner, the wood purchaser or by the mill, depending on agreement.

The above-described, repeated operations of loading and unloading of wood require time, fuel, and stressful crane operation, which may lead to injuries and requires well-trained operators. Several storage sites in the transport chain tie up capital, create storage costs, and degrade the quality of wood. Full payment for raw materials sold and work performed can be delayed up to 12 months. The grade identity of the wood is lost in the process, with resulting high costs as a consequence for all parties involved. The transportation and transfer costs are high. The burden on the road network is heavy.

The object of the present invention is a provide a more efficient method of handling wood from harvesting to customer, e.g. in the form of a purchaser or a processing site, which enables a substantial reduction, and in some cases even elimination, of the above-discussed disadvantages associated with the conventional wood handling.

The load carrier according to the invention is characterized in that the second end portion of the load changing frame is shaped in the same way as the first end portion, wherein the load changing frame comprises a second lifting stand that is shaped and arranged in accordance with the first lifting stand, wherein the second lifting stand is arranged at the second end portion of the load changing frame and has two legs, which have a lower end portion and an associated lower end, said lifting stand legs being rigidly connected by their ends or end portions to the end portions or ends of the longitudinal frame beams adjacent to the transverse frame beam and extending upward from the longitudinal frame beams, wherein the lifting stand exhibits a web portion and a top portion, said top portion forming a cross connection for anchoring the lifting stand legs to each other, said cross connection comprising a loop forming lifting loop, with which a gripper of a lifting beam of a load changer is intended to be brought into engagement, and wherein the lifting stand tapers in an upward direction toward said centre plane and is open in a vertical direction downward, that the two transverse frame beams, which are located at the first and second end portions of the load changing frame, are elongated to extend outward from the longitudinal frame beams for mounting of supports facing the support surface, and that a plurality of empty load carriers of the above-defined kind are adapted to be stacked on top of each other into a stack, where each overlying load carrier with its lifting stands is adapted to straddle the lifting stands of the immediately underlying load carrier vertically from above, wherein the length of the stack corresponds to the length of the load carrier.

The invention will be described more closely with reference to the drawings.

FIG. 1, Prior Art, illustrates a traditional process for harvesting and handling of wood in several steps.

FIG. 15a illustrates the transfer of a stack of load carriers according to the invention from a load changing truck to a driver-controlled load changing off-road vehicle, when delivering empty load carriers to a forest area that is to be harvested.

FIG. 15b and FIG. 15c illustrate alternative methods of transferring the delivered stack of load carriers at the forest area or at its load transfer site.

FIG. 16a and FIG. 16b illustrate corresponding alternative methods of handling the load carriers by a harvester, where the stack is placed on the ground and on a wireless-controlled load changing off-road vehicle, respectively.

FIG. 8, and possible sealing.

FIG. 18a, FIG. 18b and FIG. 18c illustrate alternative methods of loading a completely loaded load carrier by transfer to a driver-controlled load changing off-road vehicle, for transport of the load carrier to a transfer site for load carriers with intact load.

FIG. 19a, FIG. 19b, FIG. 19c and FIG. 19d illustrate alternative methods of loading the load carriers at the transfer site by transferring them onto a load changing truck and its trailer, having a load transfer function, directly from the driver-controlled load changing off-road vehicle and indirectly via load carriers previously unloaded onto the ground, respectively.

FIG. 20 illustrates a loaded load changing truck with trailer that transports loaded load carriers from the load transfer site to a final destination, or to another means of transport.

FIG. 21a illustrates the load changing truck unloading load carriers by transferring and positioning the load carriers at a processing plant, where the load carriers are emptied of their contents of logs by internal handling.

FIG. 21b illustrates the load changing truck unloading load carriers by transferring and positioning the load carriers in a port area adjacent to a loading dock for loading the loaded load carriers onto a cargo ship for continued transport.

FIG. 21c illustrates the load changing truck unloading load carriers by transferring them to a railway car, having a load transfer function, for continued transport.

Figure 2:
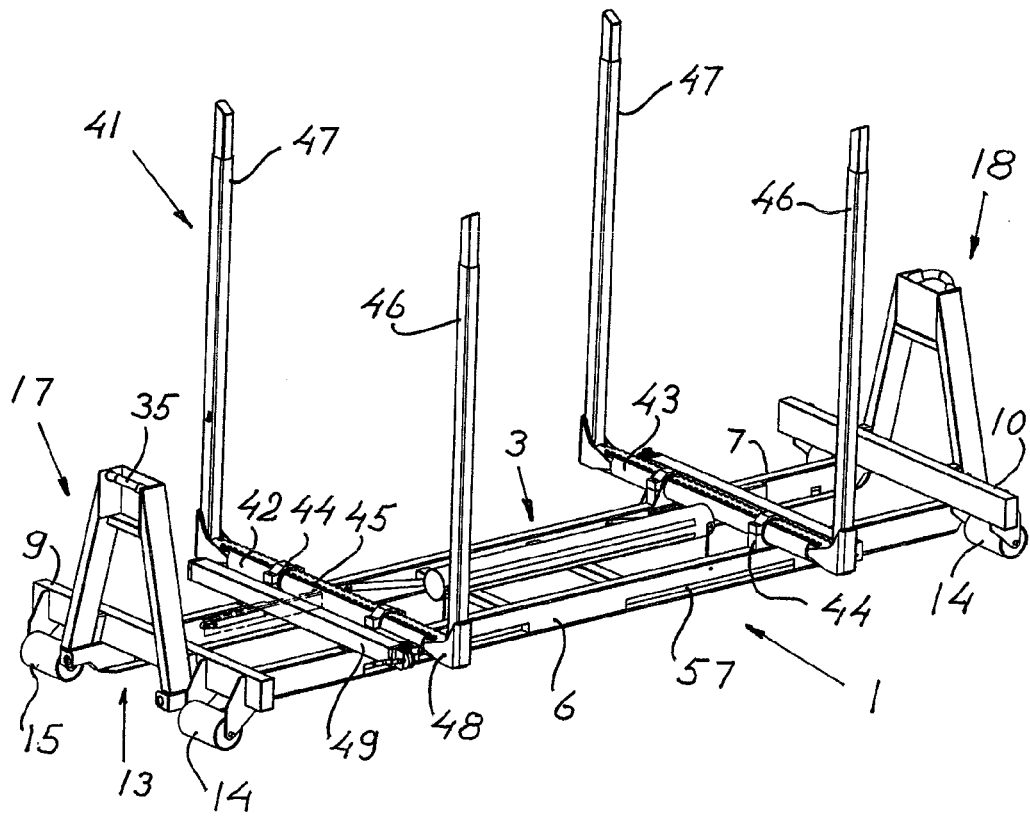
FIG. 2 is a perspective view of a load carrier according to a first embodiment of the invention, with load changing frame, bunks, stakes, and lifting rod.
Figure 3:
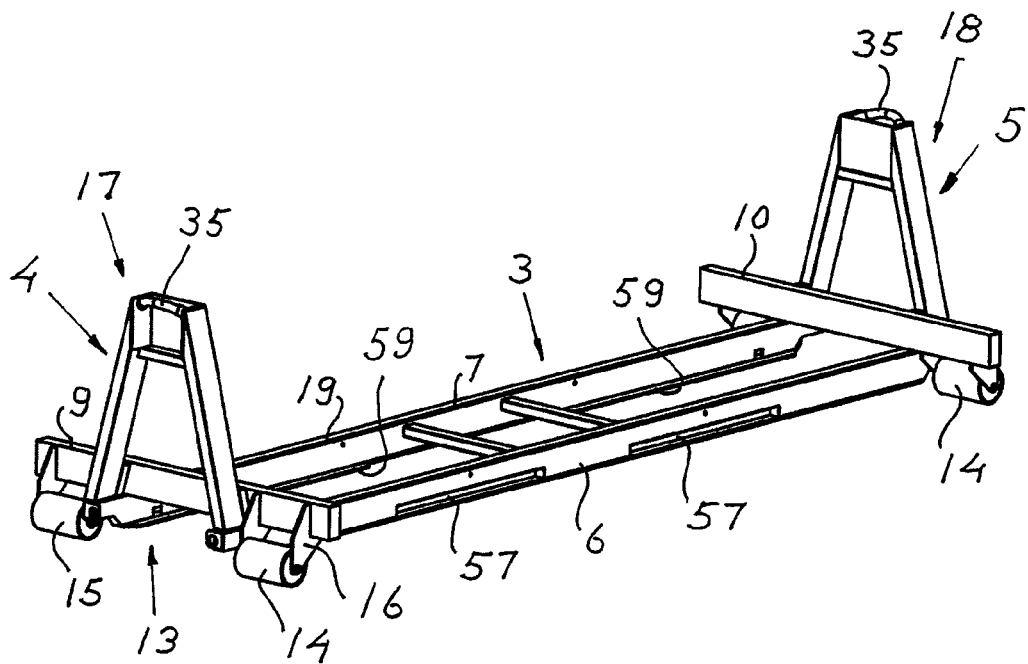
FIG. 3 is a perspective view of the load changing frame of the load carrier according to FIG. 2.
Figure 7:
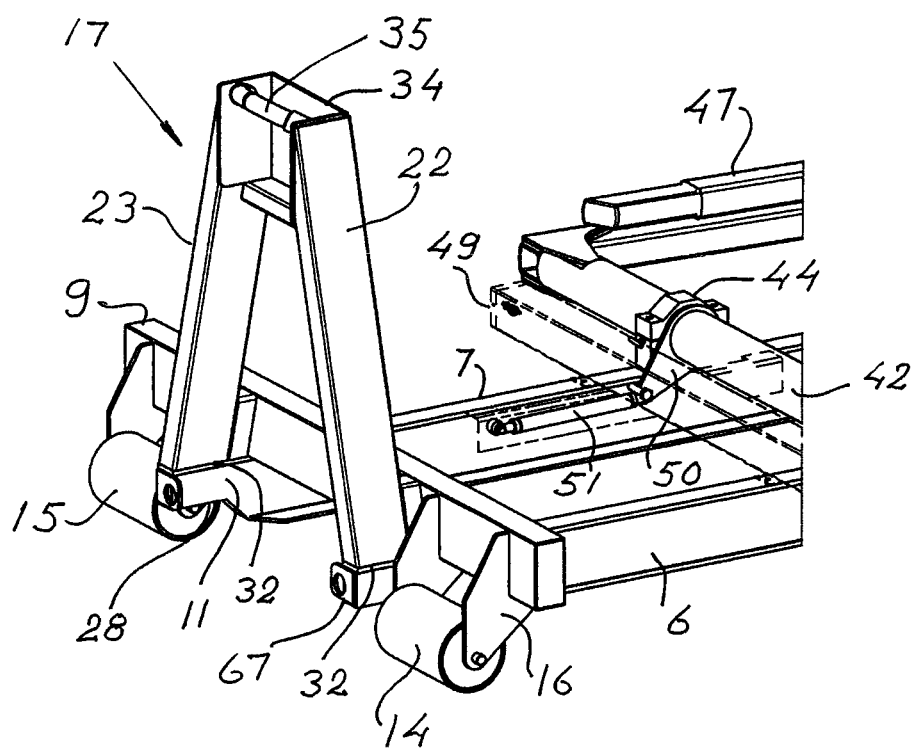
FIG. 7 is a perspective view of a portion of the load carrier according to FIG. 5, and shows one out of two bearing housings for one of the bunks, and the arrangement of a gas spring for pivoting the bunk.

FIG. 2 schematically shows a first embodiment of a detached load carrier 1 according to the invention for transport of wood based on a unitary load transfer system. The shown load carrier, which generally can be called a cassette, is specially designed to be loaded with wood, e.g. in the form of logs 2. The load carrier 1 defines a vertical, longitudinal centre plane $C_l$, see FIG. 4, and comprises a rectangular load changing frame 3, which is shown separately in FIG. 3 and has a first end portion 4 and a second end portion 5. The load changing frame 3 comprises two elongated, longitudinal, parallel frame beams 6, 7, each extending on a respective side of, and at the same distance from, said centre plane $C_l$, and which each have two end surfaces facing away from each other. The longitudinal frame beams 6, 7, forming runners for contact with a support surface, have predetermined lengths and are arranged at a predetermined distance from each other. The load changing frame 3 further comprises two transverse, parallel frame beams 9, 10, which are intersected by the centre plane $C_l$ at right angles and are disposed at the end portions 5, 6 of the load changing frame 3. The transverse frame beams 9, 10 are arranged on top of the longitudinal frame beams 6, 7, at a predetermined distance from their end surfaces, so that an outer fitting portion 11, FIG. 7, is formed on each longitudinal frame beam 6, 7, and which thus extends between the end surface of the frame beam and the nearest located vertical side surface of the transverse frame beam 9, 10. The two opposite fitting portions 11 at the respective end portion 4, 5 of the load changing frame 3 form a free space 13 therebetween, which is open vertically upward and downward. The transverse frame beams 9, 10 are permanently, fixedly connected to the longitudinal frame beams 6, 7 for the formation of a rigid, strong frame unit. The connection is usually achieved by welding. In the embodiment shown in FIG. 3, the two transverse frame beams 9, 10 are elongated to extend a predetermined length outside of the longitudinal frame beams 6, 7. The load changing frame 3 is supported by two pairs of rotatably journalled rollers 14, 15, which are arranged at said elongated end portions of the respective transverse frame beam 9, 10 via two bearing plates 16 for each roller 14, 15, said bearing plates 16 being permanently, rigidly connected to the transverse frame beam 9, 10 at a distance from each other, to receive and support the roller 14, 15, which is journalled on pivots in the two bearing plates 16.

Figure 9:
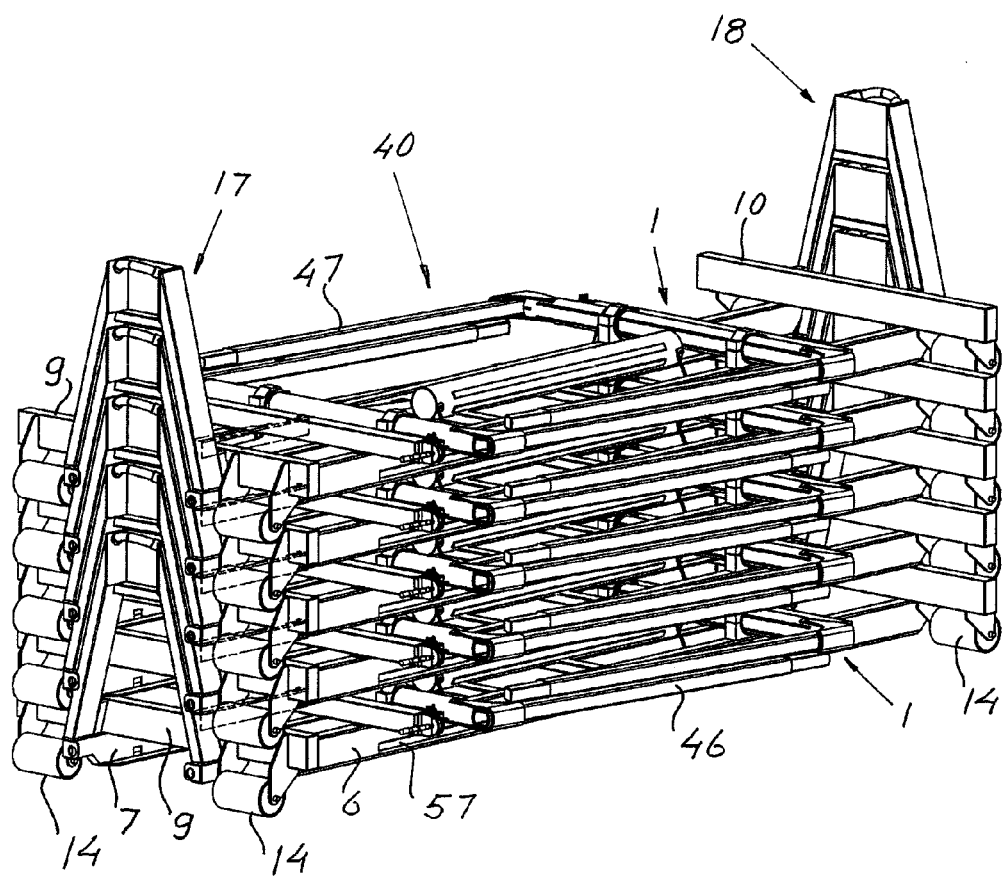
FIG. 9 is a perspective view of a stack of five load carriers according to FIG. 2.

The load changing frame 3 comprises a first lifting stand 17, which is permanently, fixedly arranged on the first end portion 4 of the load changing frame 3, and a similar, second lifting stand 18, which is permanently, fixedly arranged on the second end portion 5 of the load changing frame 3. Also these connections are usually achieved by welding. The lifting stands 17, 18 extend vertically upward from the load changing frame 3 to form a right angle with its longitudinal frame beams 6, 7, and intersect said centre plane $C_l$ at right angles. When measured at each end portion 4, 5, the load changing frame 3, including the lifting stand 17, 18, has a predetermined standard height. The lifting stands 17, 18 taper in an upward direction, as seen in an end view of the load changing frame 3. Each lifting stand exhibits a web portion 20, see FIG. 4, which transitions into a top portion or head portion 21. The lifting stand 17, 18 comprises two legs 22, 23, which are inclined toward each other in a direction upward, wherein each lifting stand leg 22, 23 has a lower, longer portion 24, which is located within said web portion 20, and an upper, shorter portion 25, which is located within said top portion 21 of the lifting stand 17, 18. In the shown embodiment, each lifting stand leg 22, 23 has a linear extension within the web portion 20 of the lifting stand 17, 18, which linear extension also continues within the top portion 21. In an alternative embodiment (not shown), the lifting stand legs 22, 23 can be curved or angled inward toward each other within the top portion 21. In the shown embodiment, the lifting stand legs 22, 23 are internally bevelled within the top portion 21, for the formation of vertical insides, facing each other, onto which vertical plates 26, laterally delimiting a space 27 therebetween, are welded. Each lifting stand leg 22, 23 has a linear outside 31, which extends within the web portion 20 and the top portion 21. Within the web portion 20, the lifting stand leg 22, 23 has a linear inside 30. Accordingly, the outside 31 and the inside 30 of each lifting stand leg 22, 23 are parallel to each other within the web portion 20. Each lifting stand leg 22, 23 has a lower end 32, see FIG. 7, by which it is permanently, rigidly connected to said outer fitting portion 11 of the longitudinal frame beam 6, 7, said fitting portion 11 thus being located immediately outside the transverse frame beam 9, 10. With its lower end portion, each lifting stand leg 22, 23 is also rigidly connected directly or, as shown, indirectly via a distance piece, to the transverse frame beam 9, 10, to ensure a strong, durable connection. The top portion 21 of the lifting stand 17, 18 has a cross connection, which comprises a lower, horizontal cross bar 33, a rearward, i.e. inner, vertical plate 34 and a loop-forming lifting loop 35. With its horizontal bottom side 36, the cross bar 33 is located at a distance from the upper ends 37 of the lifting stand leg 22, 23 to downwardly delimit said space 27, which is delimited laterally by the two vertical plates 26, which are fixedly mounted to the lifting stand legs 22, 23. The loop-forming lifting loop 35 is anchored by its ends to the upper portions of the lifting stand legs 22, 23, so as to extend out of said space 27 so that its middle portion becomes easily accessible to a gripper, such as a hook, of a lifting beam (not shown) of a load changer. Accordingly, the middle portion of the lifting loop 35 is located outside the exterior of the lifting stand. The straight lifting stand legs 22, 23 being inclined toward each other form between themselves an acute angle $\alpha$, whose bisector coincides with said centre plane $C_l$. The lifting stand legs 22, 23 delimit between themselves a free space 38, which extends downward from the top portion 21, i.e. the cross bar 33, and is freely open in a downward direction to transition directly into said space 13 between said outer fitting portions 11 of the longitudinal frame beams 6, 7. Accordingly, the stand space 38 and said space 13 together form a unitary space 69, which is thus freely accessible vertically from below, and which is thus free of structural elements which otherwise could obstruct such an advantageous accessibility vertically from below. The angularly positioned lifting stand legs 22, 23, which are thus uniformly thick, and the unitary space 69 being accessible from below between the fitting portions 11, 12 of the longitudinal frame beams 6, 7 and the lifting stand legs 22, 23, makes it possible to stack several, similar load carriers 1 on top of each other while using the entire or practically the entire space 39. Accordingly, the lifting stand 17, 18 has an external contour which, counted from the top end of the lifting stand 17, 18, defines a body that is congruent with said space 38, i.e. said internal space 38, on the one hand, and the top portion 21 and a part of the web portion 20 extending from the top portion 21, on the other hand, have their respective inner and outer contours geometrically adapted to each other. Thereby, it is possible to stack a plurality of similar load carriers 1 on top of each other for the formation of a transportable, compact stack 40, see FIG. 9, in which the lifting stands of 17, 18 of each underlying load carrier 1 are adapted to be straddled by the lifting stands 17, 18 of the immediately overlying load carrier 1 in a compact relationship, as illustrated in FIGS. 4a and 9.

Figure 4:
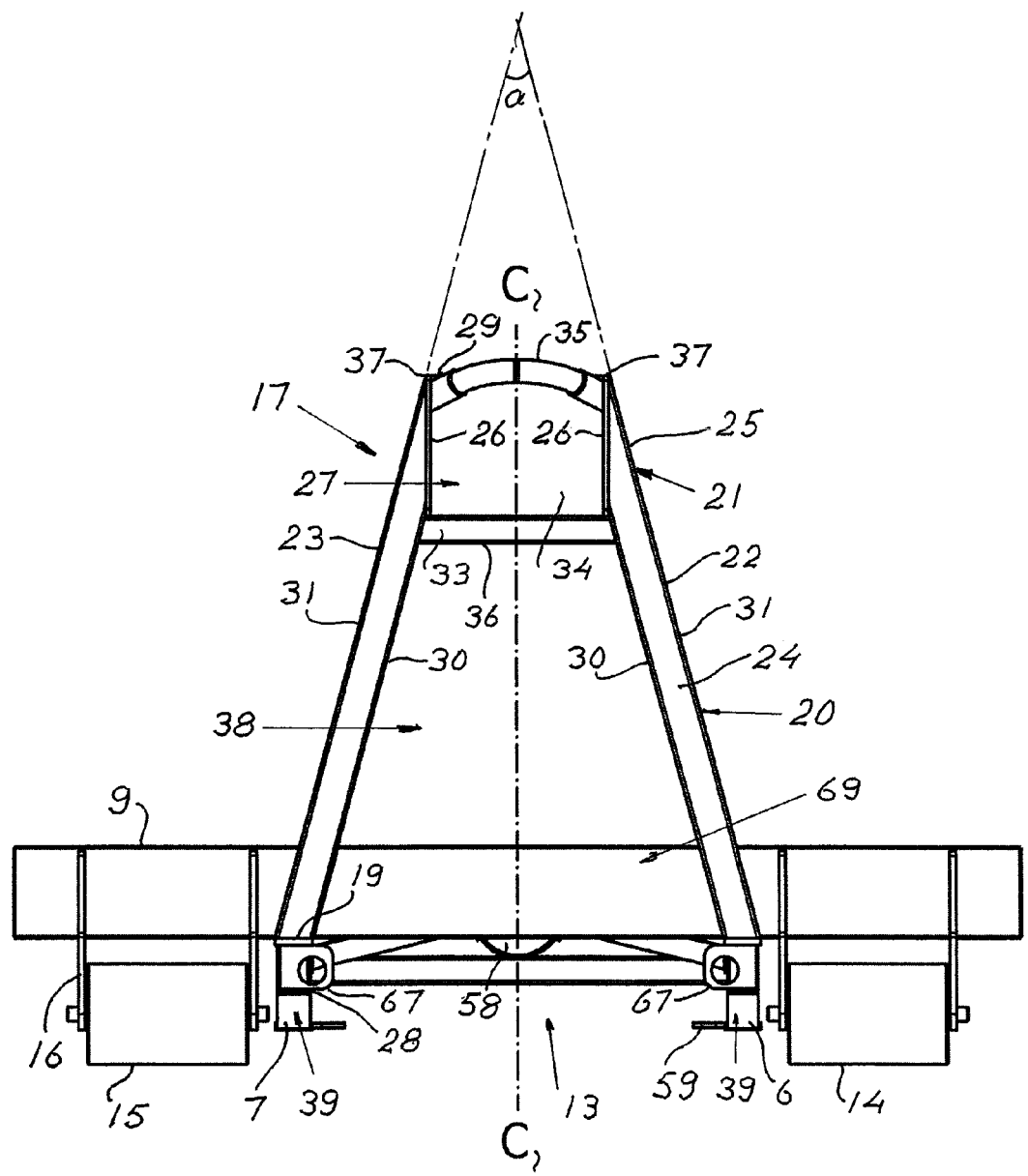
FIG. 4 is an end view of the load carrier according to FIG. 2.
Figure 4A:
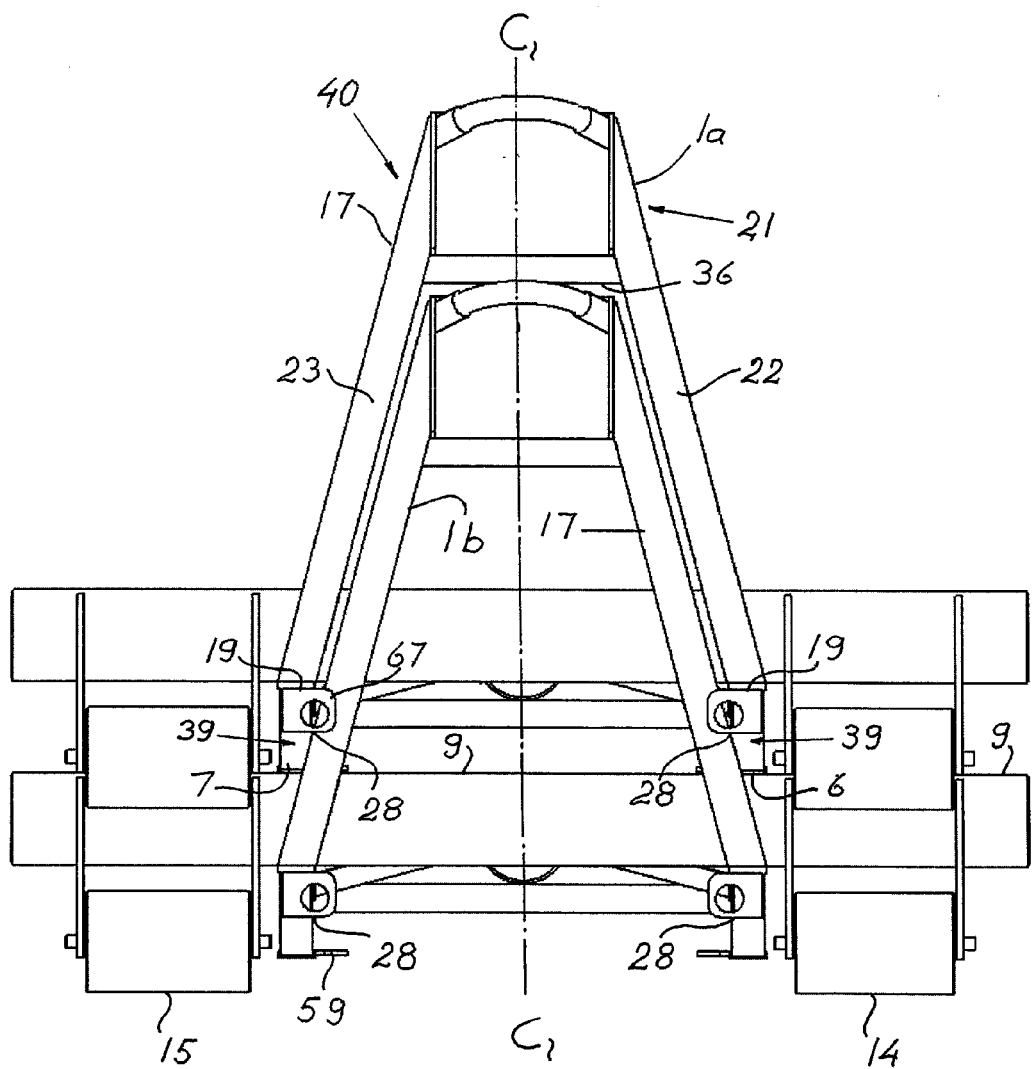
FIG. 4a shows, in an end view, two load carriers according to FIG. 4 stacked on top of each other.

Each overlying load carrier, e.g. the load carrier 1a, see FIG. 4a, is adapted to rest with the fitting portions 11, 12 (FIG. 7) of its longitudinal frame beams 6, 7 directly on the transverse frame beams 9, 10 of the immediately underlying load carrier 1b, so that the underlying load carrier 1b supports the immediately overlying load carrier 1a and accommodates the weight of it and all other overlying load carriers 1 in the stack 40. Furthermore, the fitting portions 11 of the longitudinal frame beams are provided with a recess 39, which is located in a vertical alignment with the stand legs 22, 23, so as to form an inner, lower horizontal support edge 28 of each recess 39 that is adapted to rest against the outside 31 of the stand leg 22, 23 of the lifting stand 17, 18 of the underlying load carrier 1b, at the same time as its transverse frame beam 9, 10 supports the overlying load carrier 1a via its longitudinal frame beams 6, 7. Accordingly, the inner support edge 28 is located at a predetermined distance from the top side of the frame beam 6, 7, which, however, must not be too small so that the strength of the recessed portion of the fitting portion 11 is weakened to a detrimental degree. As is evident from FIG. 4a, a small space is formed between the adjacent stand legs 22, 23 of the load carriers 1a and 1b. In the shown embodiment, the support edge 28 is located approximately at the middle of the height of the longitudinal frame beam 6, 7. By means of the described advantageous embodiment, a very good stability is obtained in the entire stack 40, where the longitudinal centre planes $C_l$ of the load carriers 1 will coincide in a common plane, thus forming the longitudinal centre plane of the stack, and be maintained in this plane during the handling and transport of the stack 40.

Figure 5:
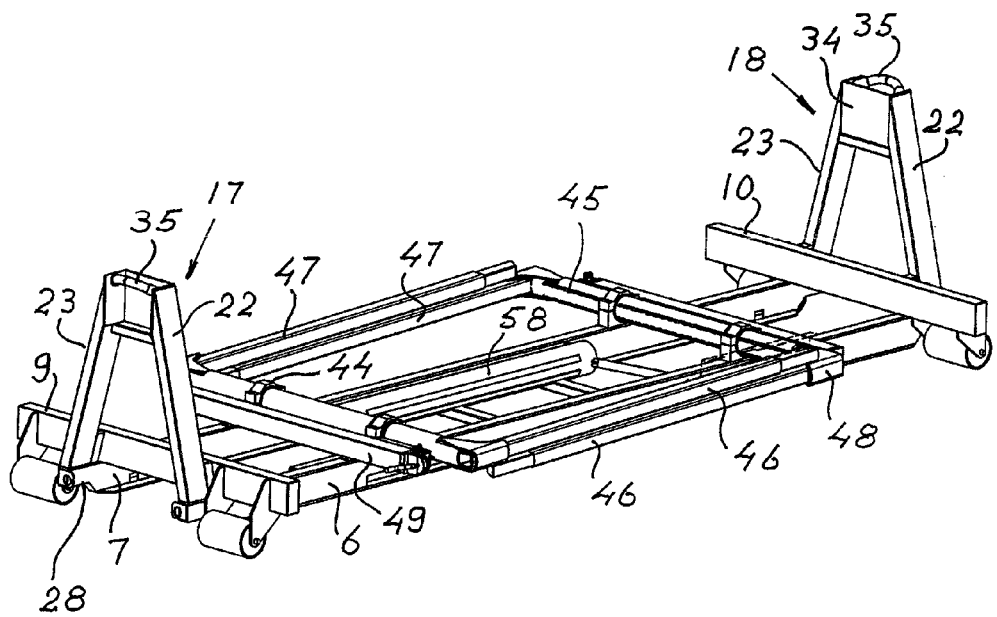
FIG. 5 is a perspective view of the load carrier according to FIG. 2, with the stakes and a central lifting rod folded down to inactive positions.
Figure 6:
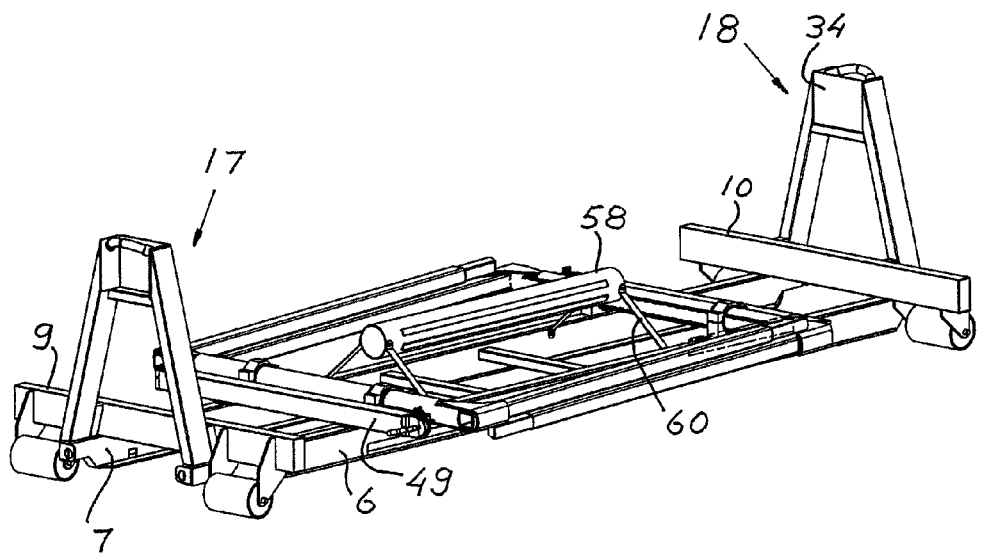
FIG. 6 is a perspective view of the load carrier according to FIG. 5, with the lifting rod in an upturned position.

The load carrier 1 further comprises a supporting device 41 for the logs 2, which is supported by the two longitudinal frame beams 6, 7 of the load changing frame 3 and which can be activated to form a loading space, when loading is to take place. In the embodiment shown in FIGS. 2, 5 and 6, the supporting device 41 comprises two parallel, transverse bunks 42, 43, onto which the load is to rest, and which themselves rest on the longitudinal frame beams 6, 7 via openable bearing housings 44, see FIGS. 2 and 7, which are fixedly mounted on the longitudinal frame beams 6, 7, at a predetermined distance from each other and from the respective transverse frame beam 9, 10. Each bunk 42, 43 is restrictedly pivotable within a range of about 80°-110°, and is provided with suitable, friction-increasing protrusions or teeth 45 on the side facing upward when the bunk 42, 43 is in its active position, said teeth 45 being intended to prevent sliding movements of the load. Each bunk 42, 43 has a predetermined length which corresponds to, or is slightly smaller than, the maximum allowable width for road transportation of loads. Furthermore, the supporting device 41 comprises a plurality of stakes 46, 47, which provide lateral support for the load, wherein each bunk 42, 43 carries two stakes 46, 47, each being rigidly connected to a respective end of the bunk 42, 43 via angle elements 48. The stakes 46, 47 are telescopic, as shown, but non-telescopic stakes can alternatively be used. The stakes 46, 47 are adapted to be folded down toward each other into a rest position, in parallel to each other and on the outside of and alongside the longitudinal frame beams 6, 7, as illustrated in FIGS. 5 and 6, during which movement of the stakes 46, 47 the bunks 42, 43 will be pivoted within a range of about 80°-110° in their bearing housings 44. Each bunk 42, 43 is provided with a radially projecting plate 50 (see FIG. 7), which is rigidly connected to the bunk 42, 43 and extends downwardly to be level with the inside of one of the frame members 7. Each plate 50 is articulately connected to one end of an elongated auxiliary lifting and damping means, e.g. a gas spring 51, which by its other end is articulately connected to a fixing element that is mounted on the inside of the frame beam 7 in question. Two end position stops (not shown) are attached to the inside of the longitudinal frame beam 7, limiting the pivotal movement by stopping the plate 50 in the two end positions. The gas spring 51 is used to assist in pivoting the two stakes 46, 47 up to an active position, after having raised the stakes 46, 47 in an initial step by a force applied from the outside, e.g. by means of a harvester.

Figure 10:
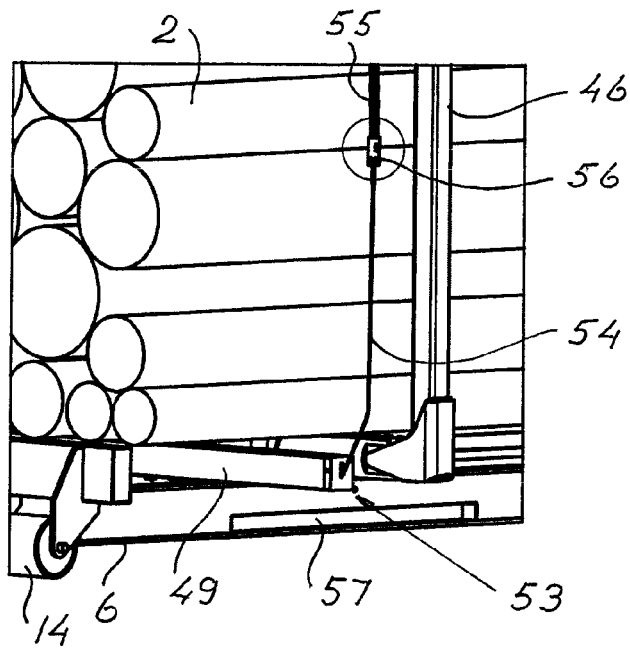
FIG. 10 is a perspective view of a portion of the loaded load carrier in FIG. 8, but being provided with a tightening device that comprises an electronic lock with a sealing function.
Figure 10A:
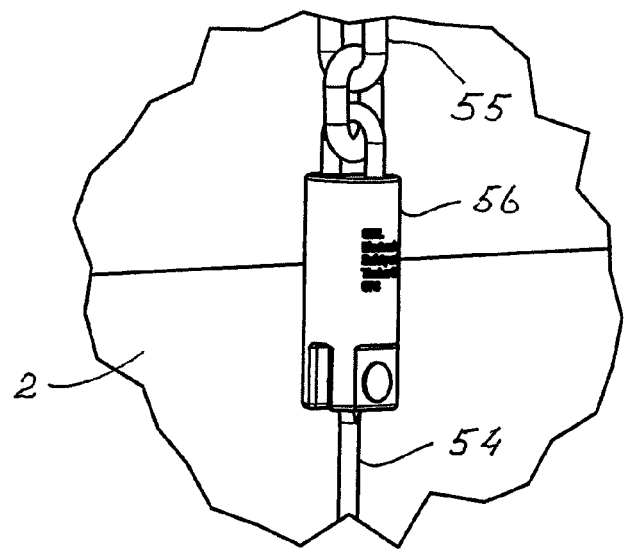
FIG. 10a is an enlarged view of the electronic lock.

The load carrier 1 further comprises two tightening devices 53 which, in the shown embodiment, are mounted inside an elongated, hollow box 49 on the top side of and across the longitudinal frame beams 6, 7, and which has a storage for a strap 54 and/or a chain 55, for enclosing and tightening the load after having attached their opposite end to the opposite side of the load changing frame 3. One of the tightening devices 53 can comprise an electronic lock 56, as illustrated in FIGS. 10 and 10a, which comprises a sealing function. A GPS function with transmitter is integrated into the load carrier 1, to give the load carrier 1 an identity and create a possibility to follow the transport route of the load carrier 1 via a receiver, and to link the identified load to the identified load carrier 1. Alternatively, the tightening devices 53 are mounted inside the transverse bunks 42, 43.

Furthermore, the load carrier 1 is provided with a lifting rod 58, see FIGS. 5 and 6, which is articulately mounted at the insides of the longitudinal frame beams 6, 7 via four link arms 60. The lifting rod 58 is adapted to assume a folded-down, protected position between the frame beams 6, 7, and an upwardly pivoted, active position a distance above the frame beams 6, 7, as shown in FIGS. 5 and 6, respectively. The lifting rod 58 is adapted to be lifted by e.g. the knives of the harvester head, to then be gripped by its rolls, after which the load carrier 1 can be picked up, e.g. from a stack 40 of similar load carriers 1, and be positioned in a desired location.

FIG. 5 shows the load carrier 1 in its inactive position for transport and storage. The stakes 46, 47 can be raised to their vertical positions, e.g. by means of a harvester, after which the load carrier 1 is ready to be loaded.

The described and illustrated superstructure of bunks 42, 43 and folded-down stakes 46, 47 are so shaped that they will not influence the stackability, i.e. this will be the same for the load carriers 1 as for the load changing frames 3, as is evident from FIG. 9, which shows a stack 40 of five similar load carriers 1 according to the invention, resulting in a load volume within allowable transportation limits. This enables low transportation costs for empty load carriers 1, from e.g. a processing plant to e.g. a new harvesting site.

An angular locking element 67, which is provided with a hole, see FIGS. 4, 4a, 7, is arranged at each end of the longitudinal frame beams 6, 7 for fixing the load carriers in the lateral direction when they are loaded onto a trailer or railway car having a load transfer function, wherein the trailer/car has two horizontal engagement pins at its inner portion which, in the final stage of the transfer operation, will penetrate into said hole and be retained therein, after having locked the load carrier to the superstructure on the chassis of the trailer/car.

Figure 12:
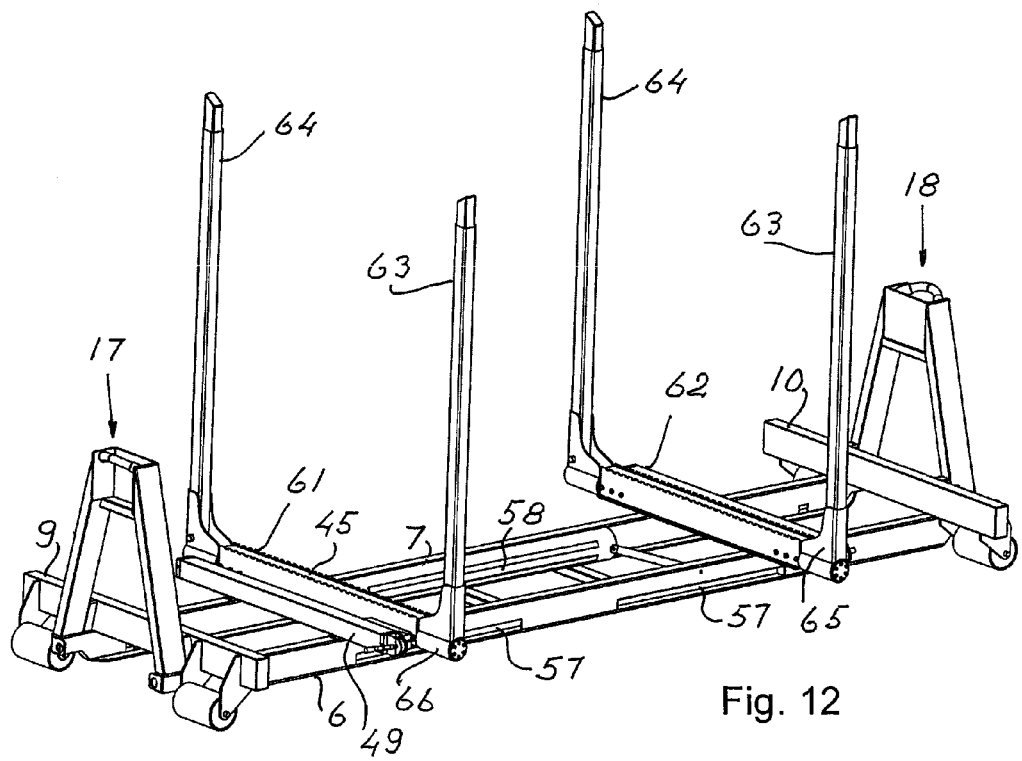
FIG. 12 is a perspective view of the load carrier according to FIG. 2, but with an alternative design of bunks and stakes.
Figure 12A:
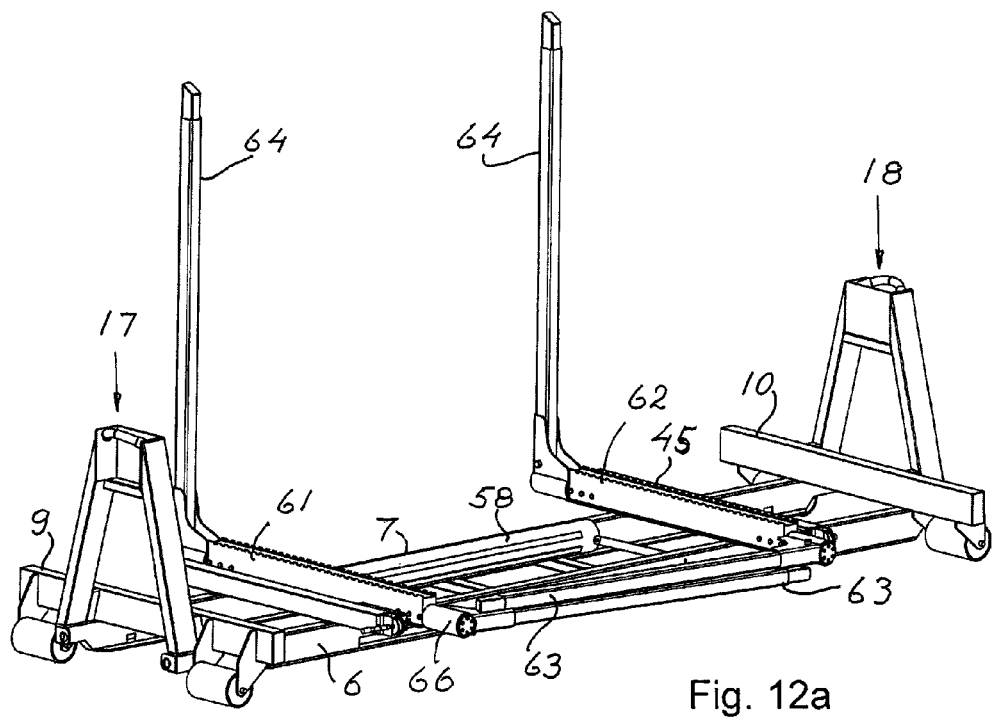
FIG. 12a is a perspective view of the load carrier according to FIG. 12, where the stakes on one side have been folded down to an inactive position.

FIGS. 12 and 12a show a second embodiment of a load carrier 1 according to the invention, which comprises the same load changing frame 3 as the one in FIG. 2. In this second embodiment, the load-carrying supporting device comprises two bunks 61, 62, which are fixedly connected to the longitudinal frame beams 6, 7, and four stakes 63, 64, which are articulately journalled to the ends of the bunks 61, 62 via angular stake holders 65 with pivots 66. The four stakes 63, 64 are pivotable separately from a vertical position, downwardly toward the outsides of the frame beams 6, 7 to assume a rest position. Each stake 63, 64 is lockable in its two positions by means of a block lock inside the stake holder 65, wherein the block lock can be released by means of e.g. a crow bar. In the embodiment shown in FIGS. 12 and 12a, the stakes 63, 64 are pivotally journalled to the bunk 61, 62, to be pivoted downward to an inactive position alongside the longitudinal frame beams 6, 7. Alternatively, they can be pivotable to be pivoted downward to an inactive position alongside the respective bunk, or to an inactive position in which they form an angle with the bunk, e.g. 45°.

Figure 11:
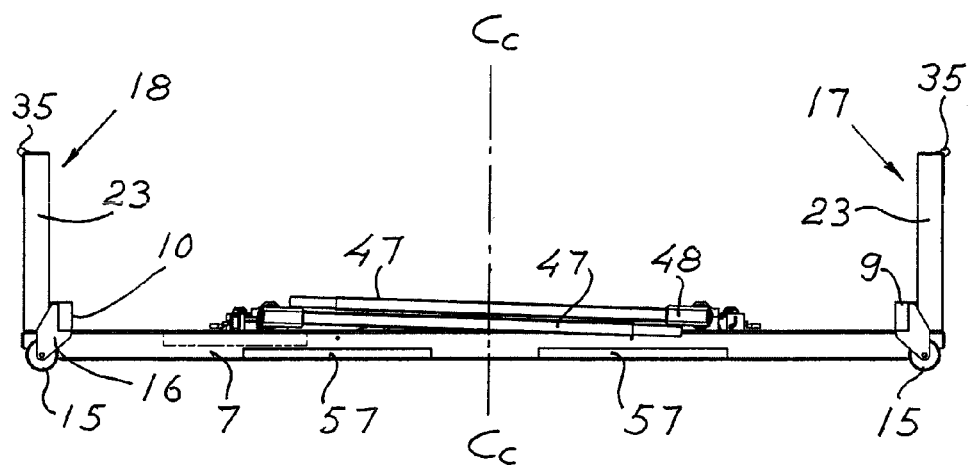
FIG. 11 is a side view of the load carrier in FIG. 5.
Figure 11A:
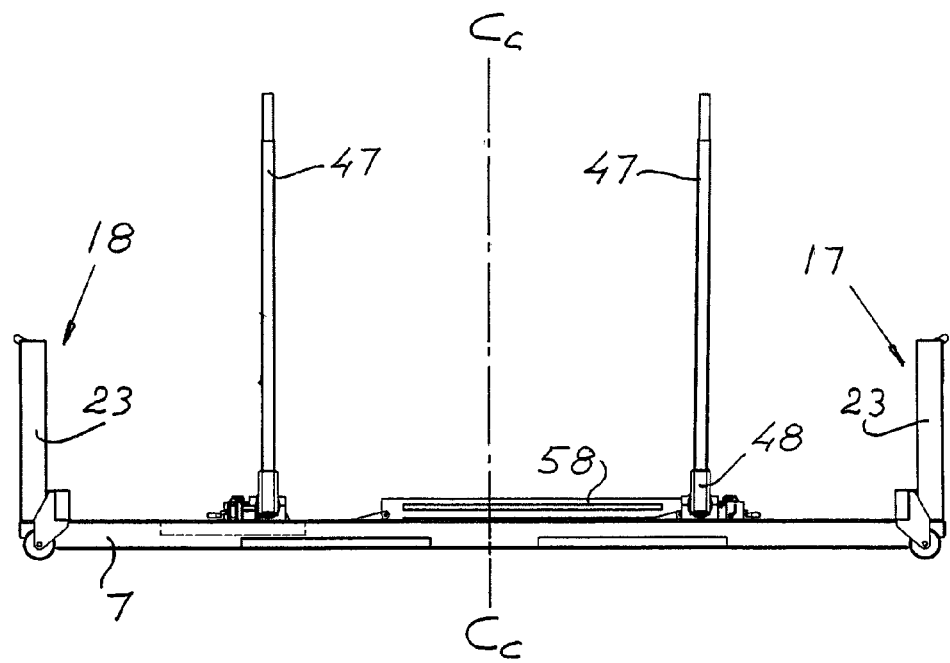
FIG. 11a is a side view of the load carrier in FIG. 2.

The above-described load carriers are structurally symmetrical about a vertical, transverse centre plane $C_c$, see FIGS. 11 and 11a. "Structurally symmetrical" means that the load carriers, in an especially particularly advantageous way, can be used for transfer of loads from any one of their two respective ends. The geometrical displacement of the lifting rod 58 relative to the transverse centre plane $C_c$ is not important for the two-ended load transfer function. Furthermore, the stacking of the load carriers 1 on top of each other is facilitated, since there is no need to take into consideration the direction in which their ends are facing.

In the shown embodiments, the length of the load carriers 1 is adapted to one pile of logs 2. They can also be designed to be loaded with two piles.

Figure 13:
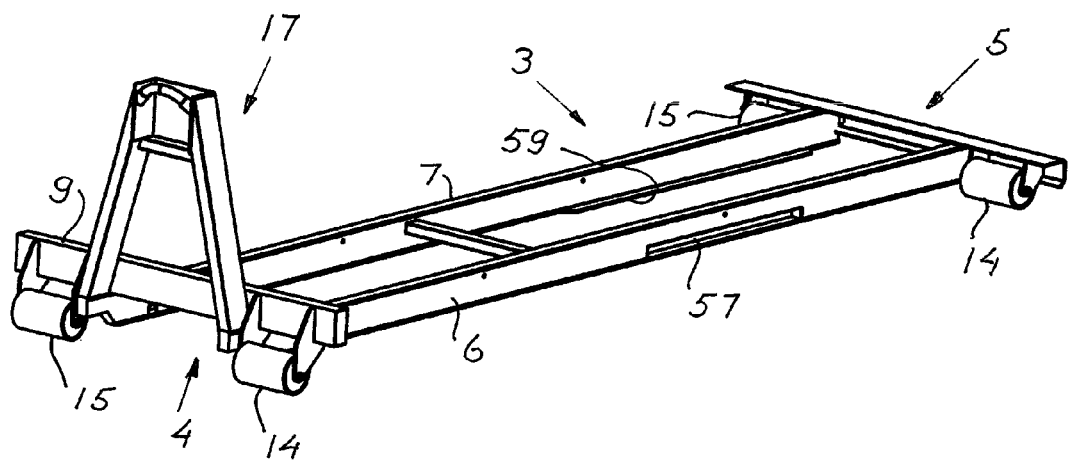
FIG. 13 is a perspective view of a load changing frame for a load carrier according to a second embodiment of the invention.

FIG. 13 shows a second embodiment of a load changing frame 3 for a load carrier 1 according to the invention. In this embodiment, there is only one lifting stand 17, which is arranged at one end portion 4 of the load changing frame 3, whereas the second end portion 5 thus lacks a lifting stand. As in FIG. 3, the load changing frame 3 is provided with rollers 14, 15 at both end portions 4, 5, to make it possible to move the load carrier 1 on a planar, firm support surface such as available in e.g. freight terminals or on loading devices in the form of e.g. rails for ships and railway cars.

Figure 14:
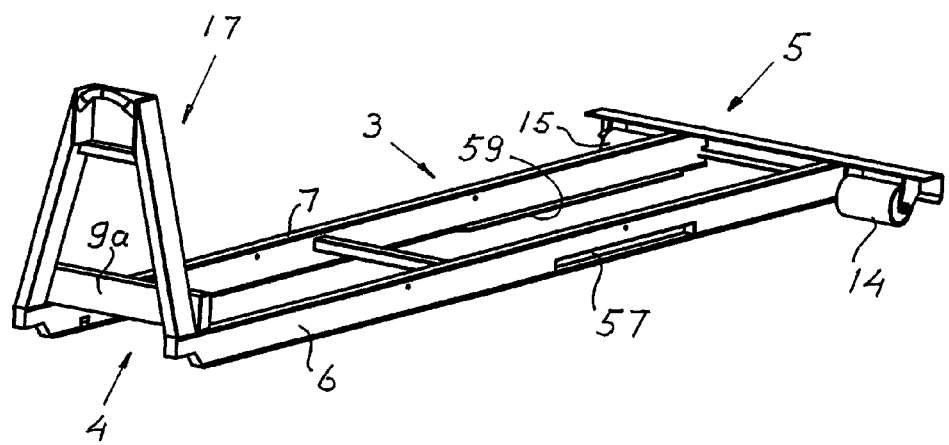
FIG. 14 is a perspective view of a load changing frame for a load carrier according to a third embodiment of the invention.

FIG. 14 shows a third embodiment of a load changing frame 3, similar to the one in FIG. 13 but lacking rollers at the first end portion 4, which comprises a lifting stand 17 of the above-described kind. In this case, the associated transverse frame beam 9a is not elongated outside of the longitudinal frame beams 6, 7. Such a simpler load changing frame 3 can be used when handling of the load carriers 1 in a freight terminal, and transportation on a ship or on railway is out of the question, where planar support surfaces are used for moving the load carriers.

The above-mentioned load transfer system comprises load changers, onto which the load carrier 1 is loaded for transport to a final destination. FIGS. 29-32 schematically show such a load changer in the form of a load changing truck 101. Such a load changer has a superstructure on the chassis comprising two parallel, longitudinal support rails 119, which are fixedly mounted to the vehicle chassis 120, and a hydraulic, central lifting beam 121 with an outer hook 122 for engagement with the lifting loop 35 of the load carrier 1, for loading and unloading of the load carrier 1. The load carrier 1 is fixed in the longitudinal direction on the load changer by maintaining said engagement. The load carrier 1 is also locked to the support rails 119 by means of a plurality of locking means, which are movable perpendicularly to, and through the support rails, to be brought into locking engagement with engagement means of the longitudinal frame beams 6, 7, said engagement means comprising longitudinal recesses 57 on the outside of the frame beams 6, 7 and longitudinal plate elements 59 on the inside of the frame beams 6, 7, see FIG. 3. At the rearward end of the vehicle chassis 120, the superstructure on the chassis has a horizontal, transverse slide bar 123 and two plate-shaped guiding means (not shown), each being aligned with a respective support rail and with which the runner-forming, longitudinal frame beams 6, 7 of the load carrier 1 are brought into contact during the loading and unloading of the load carrier 1. Such superstructures on the chassis are also present on load changers in the form of a load changing off-road vehicle 102 or 103, as illustrated, inter alia, in FIGS. 15a and 16b, respectively. Furthermore, such superstructures on the chassis are also installed on carriages providing trailers for e.g. load changing trucks or the harvester, or on railway cars, in which case the superstructures on the chassis are pivotable about a central, vertical axis. In these cases, the superstructure on the chassis can be used with or without said lifting beam. FIGS. 29-32 show the loading of a loaded load carrier 1 onto the load changing truck 101 in four successive steps. The unloading takes place in the reverse order. The loading and unloading thus take place via the rearward, transverse end of the load changer and in sliding contact therewith. Accordingly, the loading does not take place via one of the long sides of the load changer. In other words, the longitudinal axis of the load changer and the longitudinal axis of the load carrier are located in the same, or approximately in the same, vertical plane.

In the following, an embodiment of the method of handling wood in the form of logs 2, obtained by automated harvesting of forest raw material in a forest area while using a machine for logging operation according to the present invention, will be described with reference to FIGS. 15-32, which illustrate the whole logistics chain in a continuous sequence containing the different steps in which the specific, detached load carriers and the load transfer system are the common denominators for reducing the time between harvesting and processing of the forest raw material, so that it becomes possible to eliminate time-consuming operations of loading and unloading of the wood and detrimental storage of the cut wood, to instead be able to deliver fresh wood to the buyer. For reasons of simplicity, the tightening device has not been drawn on the loaded load carriers.

Figures 16C, 17:
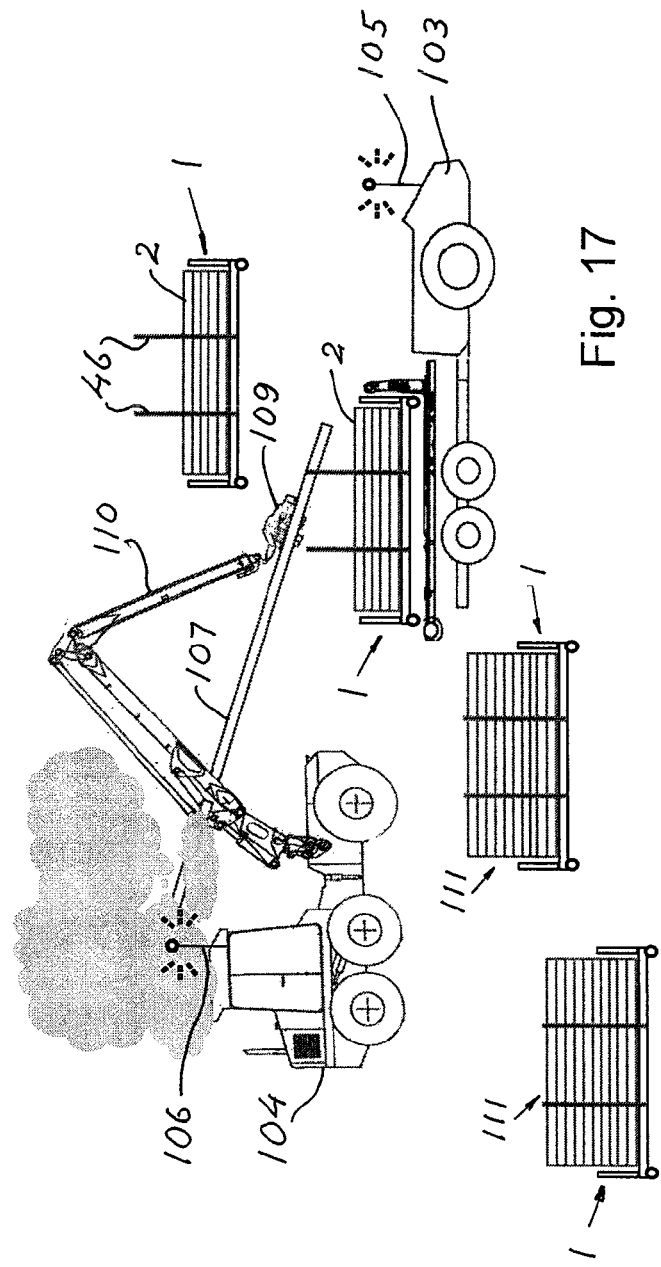
FIG. 16c illustrates a stack of load carriers which is placed within the working area of the harvester, and from which the harvester picks up new load carriers for loading.
FIG. 17 illustrates the loading of load carriers by means of the harvester, and completely loaded load carriers ready for load securing, according to e.g.
Figure 23:
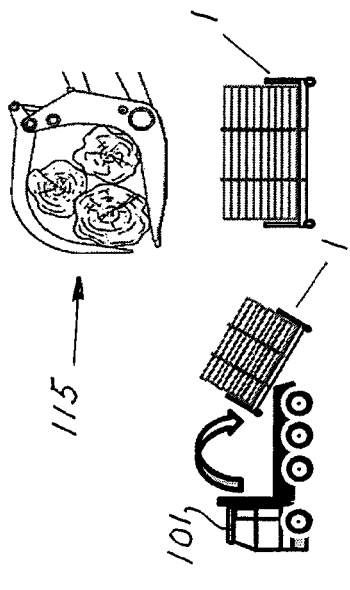
FIG. 23 illustrates the load changing truck unloading load carriers by transferring and positioning the load carriers at a processing plant, where the load carriers are emptied of their contents of logs by internal handling.
Figure 22:
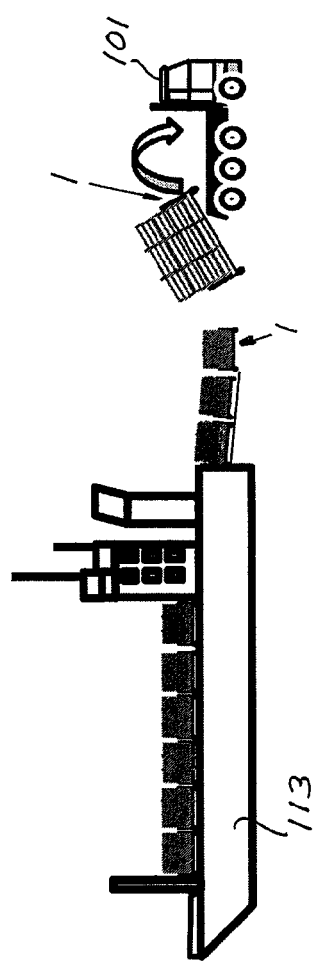
FIG. 22 illustrates the unloading of the ship in FIG. 21b in another port and the transfer of the still intact load carriers onto a load changing truck for transport to a processing plant.
Figure 25:
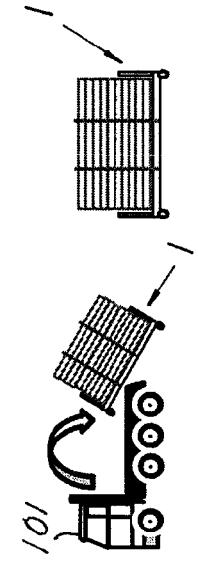
FIG. 25 illustrates the load changing truck unloading load carriers by transferring and positioning the load carriers at a processing plant, where the load carriers are emptied of their contents of logs by internal handling.
Figure 24:
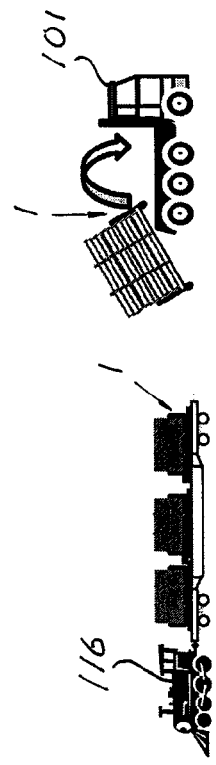
FIG. 24 illustrates the unloading of the railway car in FIG. 21c at another location and the transfer of the still intact load carriers onto a load changing truck for transport to a processing plant.
Figure 26:
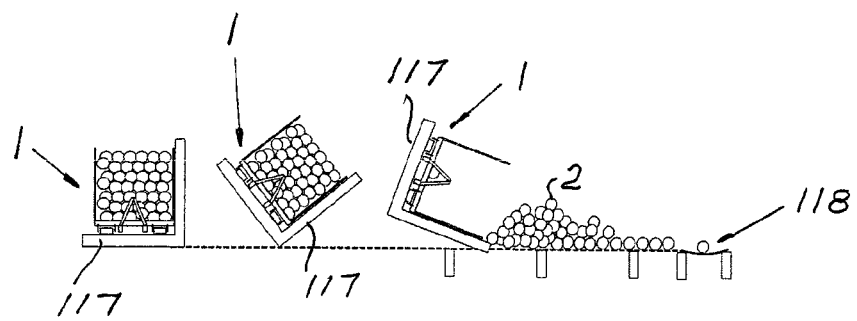
FIG. 26 illustrates a tilting device for emptying load carriers in three steps.
Figure 27:
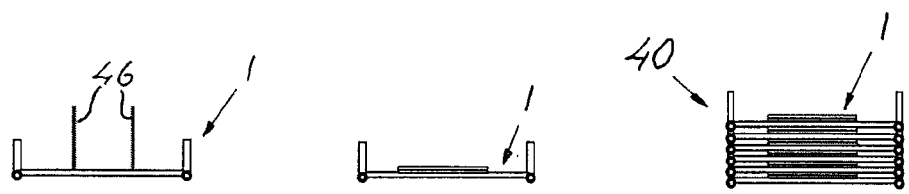
FIG. 27 illustrates stacking of load carriers, which have been emptied at the processing plant after their stakes have been folded down to an inactive position.
Figure 28:
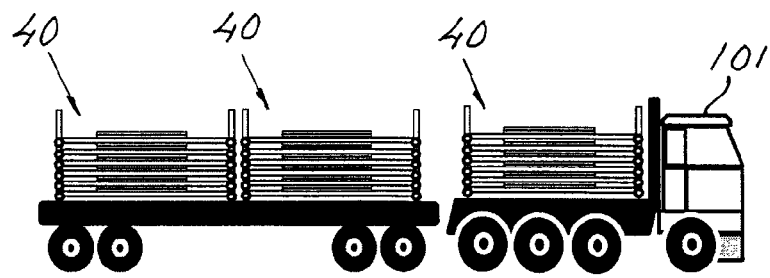
FIG. 28 illustrates a load changing truck, onto which stacks of load carriers have been loaded by transferring them, for transport to a storage site or directly to a forest area for renewed use.
Figure 29:
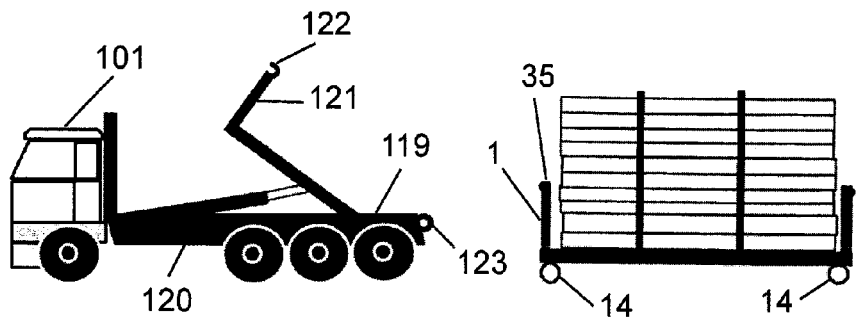
FIGS. 29-32 show a load changing truck, which is provided with a hook-equipped lifting beam for loading a loaded load carrier via the rearward end of the load changing truck, wherein the loading is shown in four steps.
Figure 30:
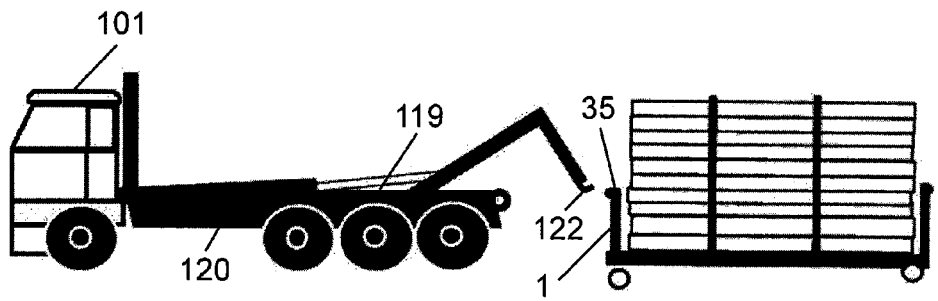
Figure 31:
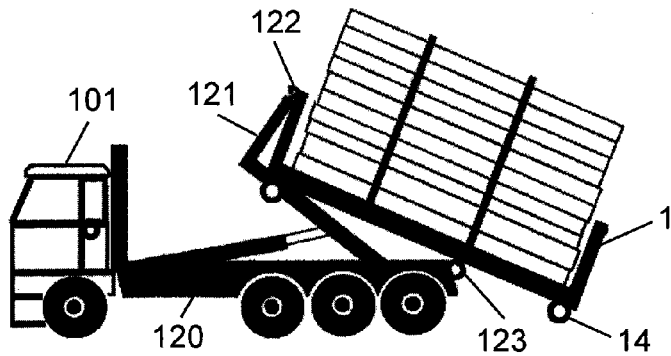
Figure 32:
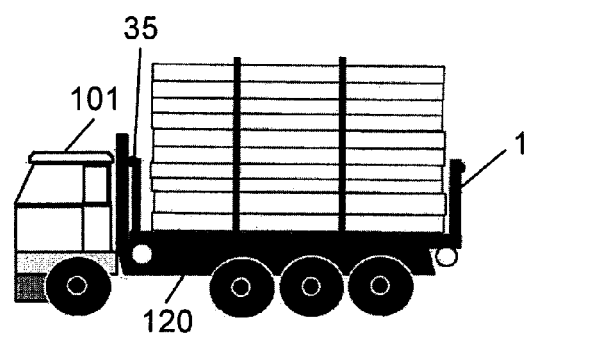

FIG. 15a illustrates the initial step, where a stack 40 of ordered, unitary load carriers 1 are delivered by a load changer in the form of a load changing truck 101 to a forest area, which comprises at least one harvesting site and at least one load transfer site that is located at a distance from the harvesting site. A load changer in the form of a driver-controlled load changing off-road vehicle 102 and the load changing truck 101 are positioned end to end, and the stack 40 of load carriers 1 is pushed or pulled over onto the off-road vehicle 102 by a conventional handling equipment with a lifting hook 122 on said truck 101, alternatively on said off-road vehicle 102, which then takes the stack 40 of load carriers 1 to one or several suitable locations within said forest area, where the stack 40 of load carriers 1 is unloaded and placed on the ground, FIG. 15b. Alternatively, the driver-controlled off-road vehicle 102 is positioned end to end with a load changer in the form of a wireless-controlled load changing off-road vehicle 103, which thus also comprises a handling equipment with a lifting hook, for transferring the stack 40 of load carriers 1 to said wireless-controlled off-road vehicle 103, FIG. 15c. The wireless-controlled off-road vehicle 103 is operated from a machine 104 for logging operation, which preferably is a harvester and which is provided with a remote control equipment, wherein the signal transfer occurs wirelessly, via e.g. antennas 105, 106 of these vehicles. Alternatively, the wireless-controlled off-road vehicle 103 is operated from a portable control box, carried by an operator, e.g. the operator of the harvester, who follows the vehicle 103 closely. Alternatively, a wireless-controlled load changing off-road vehicle 103 can be used for picking up said stack 40 of load carriers 1 directly from the load changing truck 101. According to another embodiment, the harvester has a trailer, which has a superstructure for transfer of loads on the chassis, and which can carry a stack of load carriers being picked up from the load changing truck 101 in FIG. 15a, or the driver-controlled load changing off-road vehicle 102 in FIG. 15c. The stack 40 of load carriers 1 that is placed on the ground, FIG. 15b, is picked up by the wireless-controlled off-road vehicle 102 and is taken to a suitable location for the harvester and set down on the ground, FIG. 16a. The wireless-controlled off-road vehicle 103 that has received a stack 40 of load carriers 1, FIG. 15c, is taken directly to the harvesting site, FIG. 16b. In both cases, FIG. 16a and FIG. 16b, the harvester 104 picks up one or several load carriers 1 and positions them within its working area separately in several locations or in one or several storages, FIG. 16c, for later distribution to desired locations. The wireless-controlled off-road vehicle 103 that carries a stack 40 of load carriers 1, FIG. 16b, can be moved by the harvester 104, so that the same can rapidly unload additional load carriers 1. When the load carriers 1 are positioned within a working area, the stakes 46, 47 are raised to vertical positions to delimit between themselves a loading space, so that they are ready for loading, FIG. 17. The raising of the stakes 46, 47 can be done entirely or partially by means of the harvester 104. Also the wireless-controlled load changing off-road vehicle 103 can carry a load carrier 1 ready for loading by the harvester 104, as is shown in FIG. 17. Also the driver-controlled off-road vehicle 102 and said trailer (not shown) of the harvester 104 can carry a load carrier 1 ready for loading by the harvester 104 (not shown).

Figure 8:
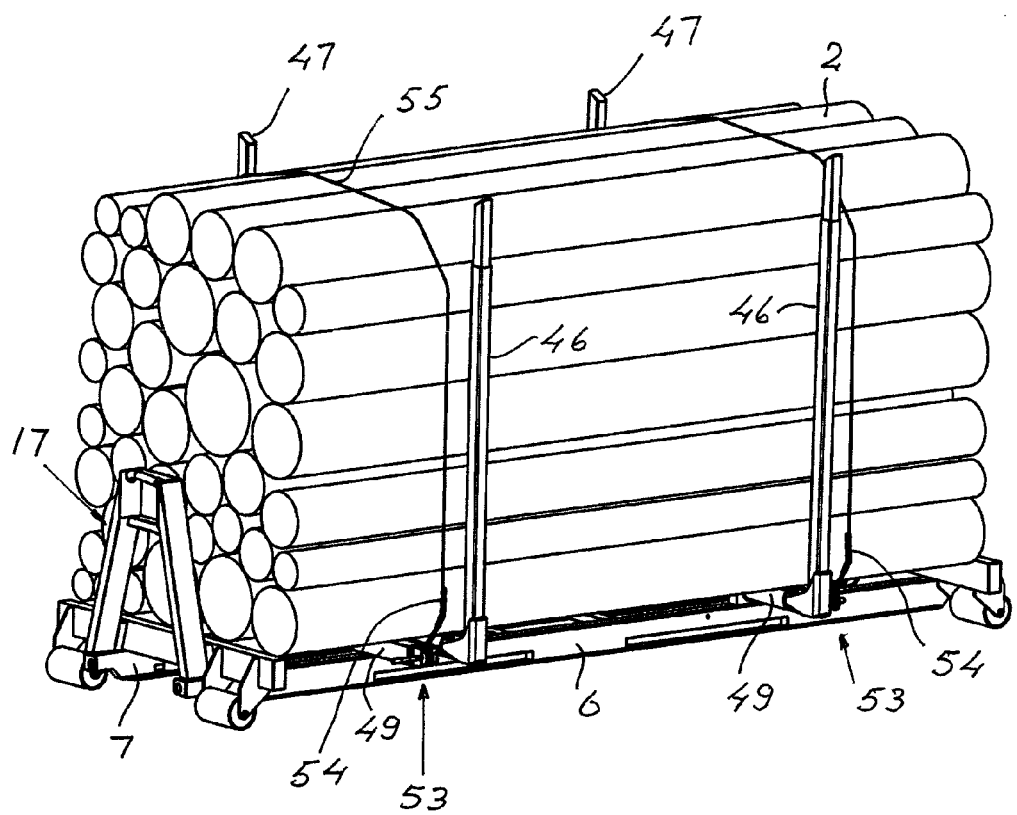
FIG. 8 is a perspective view of the load carrier in FIG. 2, with a full load of logs and with an activated tightening device for load securing.

The harvester 104 fells the tree 107, delimbs and cuts the stem into lengths according to specification. The harvester 104 comprises a processor and an equipment connected thereto for measuring and registering one or several parameters, such as length, diameter, weight, straightness, bark thickness, density, annual rings, date of felling, and other possible measurement data, and for photographing and recording the cut end surface of the stem. The registered, specific measurement data for each log 2 are electronically linked to the load carrier 1 into which the log 2 is loaded, and the log 2 can thus be called an individual piece of wood or log. Each load carrier 1 is marked with a unique identity and can thus be called an individual load carrier. The values (data) stored in the harvester from all individual logs which are loaded into the load carrier are linked to the unique identity of the load carrier. Since the load carrier is equipped with a GPS function, which can be integrated, the load carrier 1 can then be tracked and identified during the continued transport in the logistics chain. The work of the harvester 104 is facilitated in that the measurement values, from the measuring equipment which is present, inter alia, in the crane-supported harvester head 109, are displayed on computer screens in the operator's cab. Since the harvester head 109 is equipped with a sensor that detects the individual load carrier 1, it is ensured that the registered individual log is loaded into the unique load carrier. Since the weight of each log 2 is measured in the harvester crane 110 and registered in the processor, allowable load weights of the load carriers 1 are ensured for all means of transport in the logistics chain. The loading can take place directly when cutting, as illustrated in FIG. 17, in that the harvester 104 holds the delimbed portion of the stem 107 above the loading space of the load carrier 1, so that the cut log 2 drops directly into the loading space. Alternatively, the harvester may first fell a plurality of trees which are left lying on the ground, to then once again be gripped by the harvester for delimbing, cross-cutting and registering, and positioning the logs 2 into the right load carriers 1 according to specification, in the same way as above. When a load carrier 1 is completely loaded, the timber pile 111 is secured according to existing security regulations for wood handling. For this purpose, a tightening device 53 is used, as illustrated in FIGS. 8 and 10, which secures the logs 2 so that no movements occur between the logs 2. The tightening device 53 is automatically self-tightening during the handling of the completely loaded load carrier 1. If desired, the load carrier 1 with secured load can also be sealed. The registered measurement values for the harvested wood in each individual load carrier with secured load is saved in the processor of the harvester, and without delay transmitted to the transporting company and the buyer (customer) of the wood. Payment for executed work and harvested wood can be made to the logging machine contractor and the forest owner already at this stage.

The load carriers 1 with secured load standing on the ground are picked up by a driver-controlled load changing off-road vehicle 102, FIG. 18a, for transport away from the harvesting area. Alternatively, they are transported by a wireless-controlled load changing off-road vehicle 103 to an adjacent basic road, to be picked up by a driver-controlled load changing off-road vehicle 102. The load carriers 1 with secured loads which are carried by a wireless-controlled load changing off-road vehicle 103 already from the beginning are either unloaded at a suitable location in the harvesting area, e.g. at said basic road, and are picked up by a driver-controlled load changing off-road vehicle 102 for transport away from the harvesting area, FIG. 18b, or are transferred directly to a driver-controlled load changing off-road vehicle 102 for transport away from the harvesting area, FIG. 18c. The thus picked-up load carriers 1, according to FIGS. 18a, 18b, 18c, are transported to a suitable load transfer site, where they are loaded directly onto a load changing truck 101, FIG. 19a, and, where appropriate, onto a load changing truck trailer 112, FIG. 19b, for further transport on a motor road. This load changing truck 101 is of the same type of load changing truck, i.e. load changer, as was used in the initial step, FIG. 15a. Also the load changing truck trailer 112 is part of the load transfer system in that is provided with a superstructure for transfer of loads on the chassis. In case no such load changing truck 101, with or without trailer, has arrived yet to the load transfer site, the driver-controlled load changing off-road vehicle 102 unloads the load carrier 1 and places it on the ground, FIG. 19c, possibly to later carry out loading of the load changing truck 101 and its trailer. The load changing truck 101 can of course load a load carrier onto its chassis by itself, FIG. 19d, and also transfer one or two load carriers 1 onto its uncoupled trailer, to finally pick up and pull another load carrier 1 onto its own chassis in the same way, to which the load carrier 1 is locked by means of interacting locking means 57, see FIG. 3, of the load changing truck 101. Such a locking of the load carriers 1 is done for all transports carried out by the described load changing vehicles. It is also possible to let the wireless-controlled load changing off-road vehicle 103 transport the load carrier 1 to the load transfer site and either place the load carrier 1 on the ground, as illustrated in FIG. 19c, or load it onto a load changing truck 101 and its trailer, in the same way as illustrated in FIGS. 19a and 19b. The wireless-controlled load changing off-road vehicle 103 and its lifting beam are operated by means of a control box, which is carried by an operator, who follows the vehicle 103 closely.

When necessary, for example in very broken or sensitive ground conditions, completely loaded load carriers 1 can be lifted out of the harvesting area by means of an airborne means of transport to a load transfer site, which can be accessed by transport vehicles having load transfer systems as described above.

The individual load carriers 1 are then transported to a final destination by one or several means of transport, depending on the geographical location of the final destination. In the first transport step after the load transfer site, these means of transport usually comprise vehicles for road transport, such as trucks with or without trailers. The final destination can be a processing plant, which can be reached by a single means of transport, i.e. with vehicles for road transport, or with at least one additional means of transport, such as ships and barges for water transport and cars for railway transport, wherein additional road transport may come into question in these cases.

Accordingly, the load changing truck which is illustrated in FIG. 20, and which arrives directly from the load transfer site, can take its load directly to a final destination in the form of a processing plant, FIG. 21a, where the load carriers 1 are unloaded and positioned in an assigned storage place for unloading of the logs 2 at a convenient time and continued handling of the logs according to the internal working procedure.

The load changing truck which is illustrated in FIG. 20 can alternatively be taken to a port, FIG. 21b, where the load carriers 1 are unloaded and placed at quay to be loaded onto a ship 113, wherein the load carriers 1 can be pushed, pulled, or lifted on board. The loaded ship 113 transports the load carriers 1 to a domestic or foreign port, where the load carriers 1 are unloaded from the ship, either onto quay for later loading onto another means of transport having a corresponding load transfer system, e.g. a truck, train, or directly onto such another means of transport having a corresponding load transfer system, FIG. 22, which thereafter takes the load carriers 1 to the processing plant that has ordered the wood, where the load carriers 1 are unloaded and emptied of wood as described previously, FIG. 23.

According to still another alternative, the load changing truck 101, which is illustrated in FIG. 20, can be taken to a railway yard with a loading dock for trains 116, FIG. 21c, where the load carriers 1 are unloaded by being lifted or pushed onto railway cars 114, which are part of the load transfer system with their revolving superstructures, which can be rotated in the horizontal plane to be aligned with the load changing truck 101. The loaded railway cars 114 are taken to a railway yard, which is located in close proximity to the processing plant in question, where the load carriers 1 are transferred to a load changing truck 101, FIG. 24, which then takes the load carriers 1 to the processing plant that has ordered the wood, where the load carriers are unloaded as described previously, FIG. 25.

Alternatively, said railway yard is located inside the site of said processing plant, wherein one transport with a load changing truck 101 can be eliminated.

Thus, in those cases when the processing plant is either located at a stream and has a quay of its own, or has its own railway yard with a private siding to the public railway network, no transfer to a load changing truck is needed.

At the final destinations, the load carriers 1 are emptied of their contents of individual logs according to the internal working procedure that the customer in question is using. Such a working procedure may comprise the use of suitable grapple-equipped unloading devices 115. The emptying can also be done by tilting the load carriers by means of a pivotable tilting device 117, which holds the load carrier 1 so that the logs 2 roll down onto the ground, or onto a conveyor belt, FIG. 26. The stakes 46, 47 of the emptied load carriers are folded down to transport position and the load carriers 1 are stacked on top of each other to form a stack 40 of a predetermined height, FIG. 27. The stacks 40 are loaded onto a suitable means of transport having a load transfer system, e.g. a load changing truck 101 with or without a load changing trailer 112, for transport to a storage site for intermediate storage, or directly to a forest area that is to be harvested, FIG. 28 and FIG. 15a.

A harvester 104 provided with variable wheel hubs so that the wheel width can be increased on at least one wheel axle, is preferably used. By setting an increased wheel width, the harvester obtains a correspondingly increased stability, which in its turn implies that the weight of the harvester can be reduced by removing a substantial part of the counterweight and that the harvester also will get an increased range and thus a larger working area for any chosen harvesting assembly. Among other things, the reduced weight of the harvester means less damage to the ground.

In those cases when the timber cannot be sorted and/or is not desired to be sorted in the forest due to various external conditions, the load carrier and its contents are still defined and identifiable. The load can either be delivered to end customer site unsorted, or via sorting plants for sorting the logs 2 and loading the logs into empty load carriers, so that each load carrier 1 contains one and the same assortment, after which the completely loaded and secured load carriers 1 are loaded onto the same, or onto another, load changing truck for continued transport.

Figure 1:
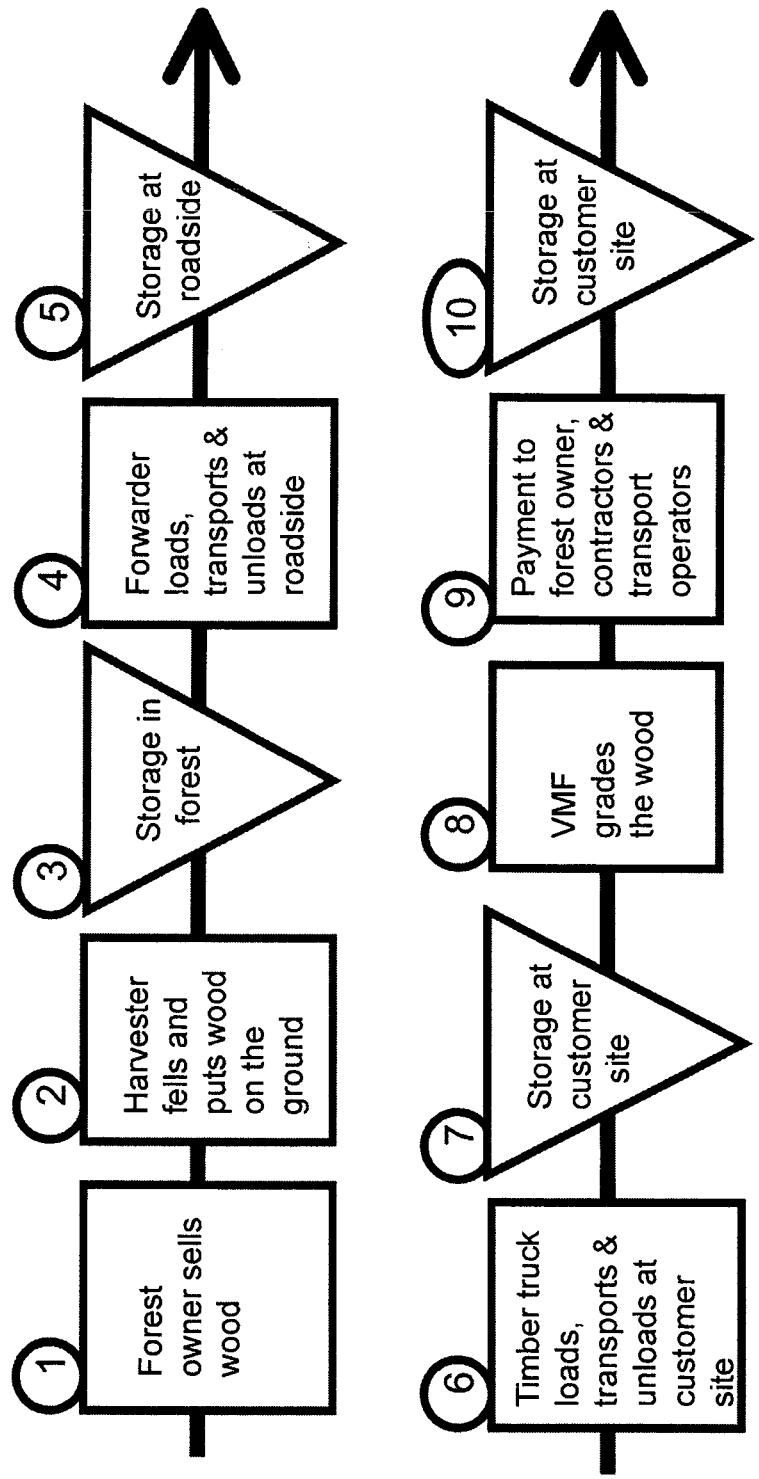

With reference to FIG. 1, Prior Art, the steps 3, 5, 7 and 8 in the conventional handling operation are completely eliminated by means of the method according to the invention, and substantial changes take place in the other steps, as is evident above.

Each load carrier 1 holds its secured load the entire transport route from the harvesting site to the final destination, which can be a customer site, such as a purchaser site, or a processing plant, where they are emptied of their contents of wood. If the wood is sorted so that each load carrier 1 contains one and the same assortment, this sorting will be maintained the entire transport route of the load carriers 1. This results in an increased efficiency with corresponding cost reduction. In the conventional, imperfect wood handling, the sorting losses of timber can amount to as much as 20%. It is appreciated that the conventional measurement of wood delivered can be eliminated by means of the method according to the invention. By means of the invention, crane-equipped forwarders and timber trucks can be eliminated. Since the crane-equipped timber trucks are replaced with standardized load changing trucks, a possibility of an increased flexibility with alternative loads for the load carriers, and thus an increased load factor, is created. In addition, since the load carriers are provided on the basis of being used in a unitary load transfer system, the transfer of the load carriers to railway transport is facilitated also for rails with overhead electric lines. The faster and more simple transfer of the load carriers to and from railway transport reduces the handling cost and reduces the need of special terminals, enabling cost efficiency also for shorter transport distances on rail. The sawmills demand fresh and undamaged wood for easier processing and higher degree of utilization. The paper and pulp industry demands fresh and undamaged wood, which has not been subjected to attack resulting in colour changes, which requires chemical treatment in the subsequent processing processes.

The method according to the invention results in substantial fuel savings in the logistics chain. These are primarily achieved in that the loading and unloading of cut wood with crane-equipped forwarders and timber trucks can be eliminated completely, that idle running in connection with such loading and unloading disappears, and that the operation of the forwarder in the harvesting area in connection with loading of smaller piles of cut wood can be eliminated.

The invention claimed is:

1. A load carrier for transport of wood in the form of logs, said load carrier defining a longitudinal centre plane and comprising a load changing frame, which has a first end portion and a second end portion, said load changing frame comprising:

two longitudinal frame beams, two transverse frame beams arranged at the end portions of the load changing frame, and a first lifting stand that is arranged at the first end portion of the load changing frame and that has two legs, which have a lower end portion and an associated lower end, said lifting stand legs being rigidly connected by their ends or end portions to the end portions or ends of the longitudinal frame beams adjacent to the transverse frame beam and extending upward from the longitudinal frame beams, wherein the lifting stand exhibits a web portion and a top portion, said top portion forming a cross connection for anchoring the lifting stand legs to each other, said cross connection comprising a loop-forming lifting loop, with which a gripper of a lifting beam of a load changer is intended to be brought into engagement, and wherein the lifting stand tapers in an upward direction toward said centre plane and is open in a vertical direction downward, wherein the second end portion of the load changing frame is shaped in the same way as the first end portion, wherein the load changing frame comprises a second lifting stand that is shaped and arranged in accordance with the first lifting stand, wherein the second lifting stand is arranged at the second end portion of the load changing frame and has two legs, which have a lower end portion and an associated lower end, said lifting stand legs being rigidly connected by their ends or end portions to the end portions or ends of the longitudinal frame beams adjacent to the transverse frame beam and extending upward from the longitudinal frame beams, wherein the lifting stand exhibits a web portion and a top portion, said top portion forming a cross connection for anchoring the lifting stand legs to each other, said cross connection comprising a loop-forming lifting loop, with which a gripper of a lifting beam of a load changer is intended to be brought into engagement, and wherein the lifting stand tapers in an upward direction toward said centre plane and is open in a vertical direction downward, that the two transverse frame beams, which are located at the first and second end portions of the load changing frame, are elongated to extend outward from the longitudinal frame beams for mounting of supports facing the support surface, and that a plurality of empty load carriers of the above-defined kind are adapted to be stacked on top of each other into a stack, where each overlying load carrier with its lifting stands is adapted to straddle the lifting stands of the immediately underlying load carrier vertically from above, wherein the length of the stack corresponds to the length of the load carrier.

2. The load carrier according to claim 1, wherein the load carrier, adjacent to each of said lifting stands, exhibits a space that is open in a vertical direction downward and that is delimited at least laterally by the lifting stand legs.

3. The load carrier according to claim 2, wherein said space is delimited laterally by the lifting stand legs and by outer fitting portions of the longitudinal frame beams, said fitting portions supporting the lifting stand legs by a rigid connection at their lower ends.

4. The load carrier according to claim 2, wherein said space is delimited laterally only by the lifting stand legs, which are rigidly connected to the ends of the longitudinal frame beams.

5. The load carrier according to claim 1, wherein said overlying load carrier is adapted to rest with its longitudinal frame beams on the transverse beams of said underlying load carrier.

6. The load carrier according to claim 3, wherein the lateral portions of the fitting portions facing each other have support edges or rest surfaces, which are adapted to bear against the outsides of the stand legs of an underlying load carrier when stacking the load carriers.

7. The load carrier according to claim 6, wherein each fitting portion has a recess, which extends at least from an inner portion of the bottom side of the longitudinal frame beam for the formation of said rest surface or support edge.

8. The load carrier according to claim 1, wherein the height of the stack increases with each additional stacked load carrier, with a height that is equal to, or approximately at least equal to, the height of the top portion of the lifting stand.

9. The load carrier according to claim 1, wherein said space, on the one hand, and the top portion and a larger portion of the web portion, counted from the top portion, on the other hand, have their respective inner and outer contours geometrically adapted to each other.

10. The load carrier according to claim 1, wherein the load carrier comprises a supporting device, delimiting a loading space for the wood.

11. The load carrier according to claim 10, wherein the supporting device comprises a plurality of stakes adapted to assume a vertical, active position, in which they provide lateral support for the load, and an inactive position, moved substantially horizontally away directly adjacent to the load changing frame, to allow said stacking.

12. The load carrier according to claim 10, wherein the supporting device comprises a plurality of bunks, which are mounted on the load changing frame across said centre plane and which carry one of said stakes at each of their ends, and that the stakes are pivotally journalled for movement between said active position and inactive position.

13. The load carrier according to claim 12, wherein each bunk is pivotally mounted on the longitudinal frame beams, and that each stake is fixedly connected to its bunk, to be moved by the bunk, by each pivotal movement of the same.

14. The load carrier according to claim 12, wherein each stake of each bunk is pivotally journalled to the bunk for movement between said two positions independently of the other stake of the respective bunk.

15. The load carrier according to claim 12, wherein the two stakes of each bunk are pivotally journalled for simultaneous movement between said two positions.

16. The load carrier according to claim 1, wherein said supports preferably are rollers, and that the load carrier is symmetrical about a transverse centre plane.

17. The load carrier according to claim 1, wherein the lifting stand legs are linear, at least in the part of the web portion that is located closest to the top portion, and form an acute angle α with each other.

18. A method of handling wood in the form of logs from harvesting site to final destination, said wood being obtained by processor-controlled harvesting of forest raw material while using a for logging operation, said method comprising the following steps:

a) that a stock of empty, detached load carriers, stackable on top of each other and having a load changing frame, are delivered to a forest area, said forest area comprising at least one predetermined harvesting site and at least one load transfer site that is located at a distance from the harvesting site and that is accessible to a loading vehicle, and are positioned in said at least one harvesting site and prepared as required to be loaded with cut logs b) that the cut logs are loaded into the prepared load carriers at the harvesting site by means of said machine for logging operation, c) that completely loaded load carriers are transported from the harvesting site to the load transfer site by load changers for off-road transportation, d) that the load carriers are loaded onto said loading vehicle at the load transfer site, e) that the load carriers are transported from the load transfer site to a final destination with one or several means of transport, which is/are chosen in dependence of the geographical l location of the final destination relative to the forest area from which the logs are delivered, wherein at least the initial section of the total transport distance between said load transfer site and said final destination is handled by said loading vehicle, f) that the load carriers are emptied of their contents of logs at the final destination, g) that at least some of the emptied load carriers are stacked on top of each other into stacks of a predetermined height, and h) that said stacks of load carriers are loaded onto a means of transport and transported away from the final destination for renewed use in accordance with the foregoing in a closed cycle, wherein the wood handling takes place by using a unitary load transfer system which, in addition to said load changer used in step c) above, comprises, at least one of said load carriers of claim 1, loading vehicles, which are used in the steps d) and e) above, in the form of load changers, said load changers, which are used in said steps c), d) and e), respectively, each having a lifting beam with a gripper, which is brought into engagement in an optional way with the loop- forming lifting loop of any one of the two lifting stands of the load carrier, wherein the load carrier can be gripped and handled by the lifting beam of the load changing vehicle from any one of its ends.

19. The method according to claim 18, the wood is loaded into load carriers comprising stakes for the wood, which are adapted to assume a vertical, active supporting position for delimiting a loading space for the logs, and a substantially horizontal, inactive rest position, in which rest position they are moved away to allow said stacking of empty load carriers.

20. The method according to claim 18, wherein the machine for logging operation, after delimbing of a predetermined stem length, cuts a log of a predetermined length in such a position that the cut log drops down directly into the load carrier.

21. The method according to claim 18, wherein each load carrier is given a specific identity enabling a load of logs, which during the cutting and loading are registered by a processor of the machine for logging operation for one and the same load carrier with such a specific identity, to be linked to this load carrier, and vice versa.

22. The method according to claim 18, wherein the load carriers are loaded with logs without any sorting.

23. The method according to claim 21, wherein the cut logs are sorted into different load carriers during the loading, so that each load carrier contains one and the same, known assortment.

24. The method according to claim 21, wherein cut logs belonging to different assortments are loaded into one and the same load carrier.

25. The method according to claim 21, wherein each log is identifiable with respect to the assortment it belongs to.

26. The method according to claim 21, wherein said specific identity of each load carrier is obtained by providing the load carrier with a GPS function, whereby it is possible to track and identify the load carrier during its continued, continuous transport to the final destination.

27. The method according claim 18, wherein load in the completely loaded load carrier is secured to its load changing frame by means of a tightening device.

28. The method according to claim 18, wherein the stacks of load carriers in step h) are transported to a forest area and/or a storage site for intermediate storage of empty load carriers to be ordered for delivery to a forest area that is to be harvested.

29. The method according to claim 18, wherein said transport in step c) takes place with a driver-controlled load changing off-road vehicle.

30. The method according to claim 18, wherein completely loaded load carriers in step c) are transported by a wireless-controlled load changing off-road vehicle to a basic road, to be picked up by a driver-controlled load changing vehicle.

31. The method according to claim 18, wherein the machine for logging operation is supplied with empty load carriers by means of an wireless-controlled load changing off-road vehicle.

32. The method according to claim 18, wherein said stacks of load carriers are loaded onto load changing trucks.

33. The method according to claim 22, wherein the load changing truck transports the load carriers to a sorting facility for sorting the logs and loading the logs into empty load carriers so that each load carrier contains at least one known assortment, after which the completely loaded load carriers are loaded onto the same, or onto another, load changing truck for continued transport.

* * * * *